(12) United States Patent
Yokomizo

(10) Patent No.: US 6,317,115 B1
(45) Date of Patent: *Nov. 13, 2001

(54) SYSTEM, APPARATUS AND METHOD IN WHICH A HIGH RESOLUTION IMAGE EDITOR IS CONNECTED TO A HOST COMPUTER FOR PROCESSING LOW RESOLUTION IMAGE DATA

(75) Inventor: Yoshikazu Yokomizo, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,266

(22) Filed: Jan. 20, 1998

Related U.S. Application Data

(63) Continuation of application No. 08/354,118, filed on Dec. 6, 1994, now abandoned.

(30) Foreign Application Priority Data

Dec. 9, 1993 (JP) .................................................. 5-309552
Nov. 15, 1994 (JP) .................................................. 6-280622

(51) Int. Cl.[7] ............................................ G09G 5/34
(52) U.S. Cl. .......................... 345/123; 345/132; 345/2
(58) Field of Search ................... 345/1, 2, 121, 345/125, 127, 131, 132, 123, 124, 126

(56) References Cited

U.S. PATENT DOCUMENTS

| | | | |
|---|---|---|---|
| 4,653,112 | 3/1987 | Ouimette | 382/69 |
| 5,383,027 | 1/1995 | Harvey et al. | 358/296 |
| 5,434,591 | * 7/1995 | Goto et al. | 345/123 |
| 5,436,734 | 7/1995 | Yamauchi et al. | 358/448 |
| 5,440,699 | 8/1995 | Farrand | 395/155 |
| 5,485,570 | 1/1996 | Busboom et al. | 395/161 |
| 5,515,491 | 5/1996 | Bates et al. | 395/155 |

OTHER PUBLICATIONS

IBM Technical Disclosure Bulletin, vol. 34, No. 8, p. 280, Jan. 1, 1992.*

Bill Fitler, Networked Windowing Using the X Window System. Dr. Dobbs Journal, Mar. 1989.*

* cited by examiner

*Primary Examiner*—Jeffery Brier
(74) *Attorney, Agent, or Firm*—Fitzpatrick, Cella, Harper & Scinto

(57) ABSTRACT

When a drawing function call issued from an application to the operating system is hooked, scripts corresponding to the drawing function call are issued to a server where the scripts are interpreted, an image is drawn on the image drawing memory allocated in the server, the drawn drawing image data is taken from the image memory to the operating system over the network and drawn in the screen memory.

32 Claims, 15 Drawing Sheets

MM _ open ("service","fax _ service");

MM _ send (service _ id,"MM _ send","G3","data","destination");

MM _ data (service _ id,"MM _ send","data _ id","length","content _ buffer");

MM _ close (service _ id);

"MM _ open server fax _ service"

"service _ id MM _ send G3 data destination"

"service _ id MM _ send data id length content"

"service id MM _ close"

FIG. 11

APPLICATION   CLIENT                                              CENTER SERVER

MM_open ("server","fax_service");
    Message ("MM_open server fax_service") --->
                                       <--- Message ("service_id MM_open_ack")
    gservice_id = service_id;
    return (MM_open_ack);

MM_send (service_id,"MM_send","G3","data","destination");
    Message ("service_id MM_send G3 data destination") --->
                                       <--- Message ("service_id MM_send_ack")
    return (MM_open_ack);

MM_data (service_id,"MM_send","data_id","length","content_buffer");
    Message ("service_id MM_send data_id length content") --->
                                       <--- Message ("service_id MM_data_ack data_id")
    gdata_id = data_id;
    return (MM_data_ack);

:
                :

MM_close (service_id);
    Message ("service_id MM_close") --->
                                       <--- Message ("service_id MM_close_ack")
    return (MM_close_ack);

SYSTEM, APPARATUS AND METHOD IN WHICH A HIGH RESOLUTION IMAGE EDITOR IS CONNECTED TO A HOST COMPUTER FOR PROCESSING LOW RESOLUTION IMAGE DATA

This application is a continuation of U.S. patent application Ser. No. 08/354,118, filed Dec. 6, 1994, now abandoned.

BACKGROUND OF THE INVENTION

1. Field of the Invention

The present invention relates to a multimedia server and, more particularly, to an apparatus and method for editing images, and an apparatus and method for controlling image display, which provide various service functions, such as printing/scanning, facsimile transmission/reception, database access, or computer conferences, to computers on a network.

2. Description of the Related Art

As various terminals have come to have communication functions with the advances in networking in recent years, interconnectivity becomes very important. For example, for facsimiles, there are facsimile communication protocols defined by CCITT as to a method of accessing a public network. However, protocols for a case in which terminals are formed into a network as a facsimile server have not been standardized.

Although an SQL language of ANSI has been established as a standard for a relational database (RDB), protocols for access to an RDB and a front end interface API (Application Program Interface) are different from vendor to vendor. Although there is an industry standard for each OS for printing, architecture for network printers in a multivendor environment has not yet been standardized.

Regarding OCR, since there has hitherto been no concept of networking, a method of accessing a network OCR is to be determined. There is also no concept of an image processing accelerator on the network. As described above, an effort for standardization has been made as for each individual application field, such as a database for a database, or a network printer for a network printer. However, standardization across the fields has not been made. For example, to perform a series of operations such that an image received by a facsimile server is converted into codes by an OCR server and the codes are stored in a database, since there is no linkage among the respective servers, the client side initiates three client-side programs for facsimiles, OCRs and databases and the operations are performed in sequence. The above operations may possibly be automated if the three programs perform an inter-application communication by using the functions offered from the up-to-date OS. Although the up-to-date OS offers the scheme for the inter-application communication, the way of the inter-application communication is left to a vendor and nothing has been decided.

However, in the conventional server system, for example, to perform a series of operations such that an image received by a facsimile server is converted into codes by an OCR server and the codes are stored in a database, since there is no linkage among the respective servers, the client side initiates three front-end programs, a facsimile front-end, an OCR front-end and a database front-end, and the operations are performed in sequence. However, most of the operation include a number of "cut and paste" and repetition of accesses to a "temporary file", and this entails a great burden.

Also, the method of accessing each different server is different as an inevitable historical consequence of the invention of the server, and access across the service fields is nearly impossible. The present invention is designed to integrate independent servers which are distributed on the network in a virtual manner and to logically construct a huge virtual server so that compatibility among the servers is not required and a number of server functions can be used easily from one application.

Hitherto, it is not possible for a small personal computer to edit a high-resolution image on a large screen because of shortage of memory. For example, a full-color image of an A4 size at 400 dpi (dot/inch) requires a memory of as much as 47 megabytes. Making it possible to handle such a large image by a personal computer is unrealistic in terms of cost and speed, and poses a problem from a point of view of reliability. The CPU power of a personal computer is not so large due to the limitation of a single chip architecture and is slow in speed. In the method of taking in a hard disk into a part of RAM, a despairing delay occurs each time swapping occurs. Also, in the case of the OS of the today's personal computer, if such a large memory is handled, the personal computer often crashes.

SUMMARY OF THE INVENTION

It is an aspect of the present invention to provide an image processing method and apparatus, which performs a bi-directional communication with an external apparatus, and performs image processing of image data of low resolution, the image processing apparatus comprising:

receiving means for receiving image data from the external apparatus on a basis of a request by the image processing apparatus;

extraction means for extracting drawing contents on a basis of a drawing command, called by an application, for drawing the image data received by the receiving means, wherein a drawing command is transmitted to a drawing program which is a part of OS;

generation means for generating drawing process information written in process script in accordance with the drawing contents extracted by the extraction means; and transmission means for transmitting the drawing process information to the external apparatus so that image data of high resolution stored in an image drawing memory in the external apparatus is drawn same as drawing process on a basis of the drawing command;

wherein the drawing command is used for both of drawing the received image data by the drawing program and generating the drawing process information written in process script.

It is another aspect of the present invention to provide an image drawing apparatus for drawing image data of high resolution which performs a bi-directional communication with a host computer such that the image drawing apparatus draws image data of low resolution, the image drawing apparatus comprising:

input means for inputting from the host computer drawing process information, written in process script, which designates drawing contents in accordance with drawing commands called from an application to a drawing program which is a part of OS, running in the host computer;

drawing means for interpreting the drawing process information input from the input means and for drawing the image data of high resolution in an allocated image drawing memory; and output controlling means for, when scrolling process is requested in the host computer, controlling output means to output the image data drawn by the drawing means to the host computer and, when drawing process is requested in the host computer, controlling the output means not to output the image data drawn by the drawing means, wherein the resolution of the image data stored in the image drawing memory allocated to the image drawing apparatus is higher than the resolution of the image data stored in the screen memory of the host computer.

It is a further aspect of the present invention to provide a network system including a host computer and an external apparatus, whereby the external apparatus performs image processing of image data of low resolution and bi-directional communication with the host computer, the network system comprising:

the host computer including:

receiving means for receiving image data from the external apparatus on a basis of a request by an image processing apparatus;

extraction means for extracting drawing contents on a basis of a drawing command, called by an application, for drawing the image data received by the receiving means, wherein a drawing command is transmitted to a drawing program which is part of OS;

generation means for generating drawing process information written in process script in accordance with the drawing contents extracted by the extraction means; and transmission means for transmitting the drawing process information to the external apparatus so that image data of high resolution stored in an image drawing memory in the external apparatus is drawn same as drawing process on a basis of the drawing command;

wherein the drawing command is used for both of drawing the received image data by the drawing program and generating the drawing process information written in process script, and;

the external apparatus including:

input means for inputting drawing process information, written in process script, from the host computer which designates drawing contents in accordance with drawing commands called from an application to a drawing program which is part of OS, running in the host computer;

drawing means for interpreting the drawing process information input from said input means and for drawing image data in the allocated image drawing memory; and output controlling means for, when scrolling process is requested in the host computer, controlling output means to output the image data drawn by the drawing means to the host computer and, when drawing process is requested in the host computer, controlling the output means not to output the image data drawn by the drawing means, wherein the resolution of the image drawing memory allocated in the external apparatus is higher than the resolution of the screen memory of the host computer.

The above and further objects, aspects and novel features of the invention will more fully be appreciated from the following detailed description when read in connection with the accompanying drawings. It is to be expressly understood, however, that the drawings are for the purpose of illustration only and are not intended to limit the invention.

BRIEF DESCRIPTION OF THE DRAWINGS

FIGS. 10(*a*) and 10(*b*) show examples of scripts which are transferred from a client to a center server in accordance with the present invention;

FIG. 11 shows an example of communication protocols among the client, the application, and the center server in accordance with the present invention;

DESCRIPTION OF THE PREFERRED EMBODIMENT

Figure 1:
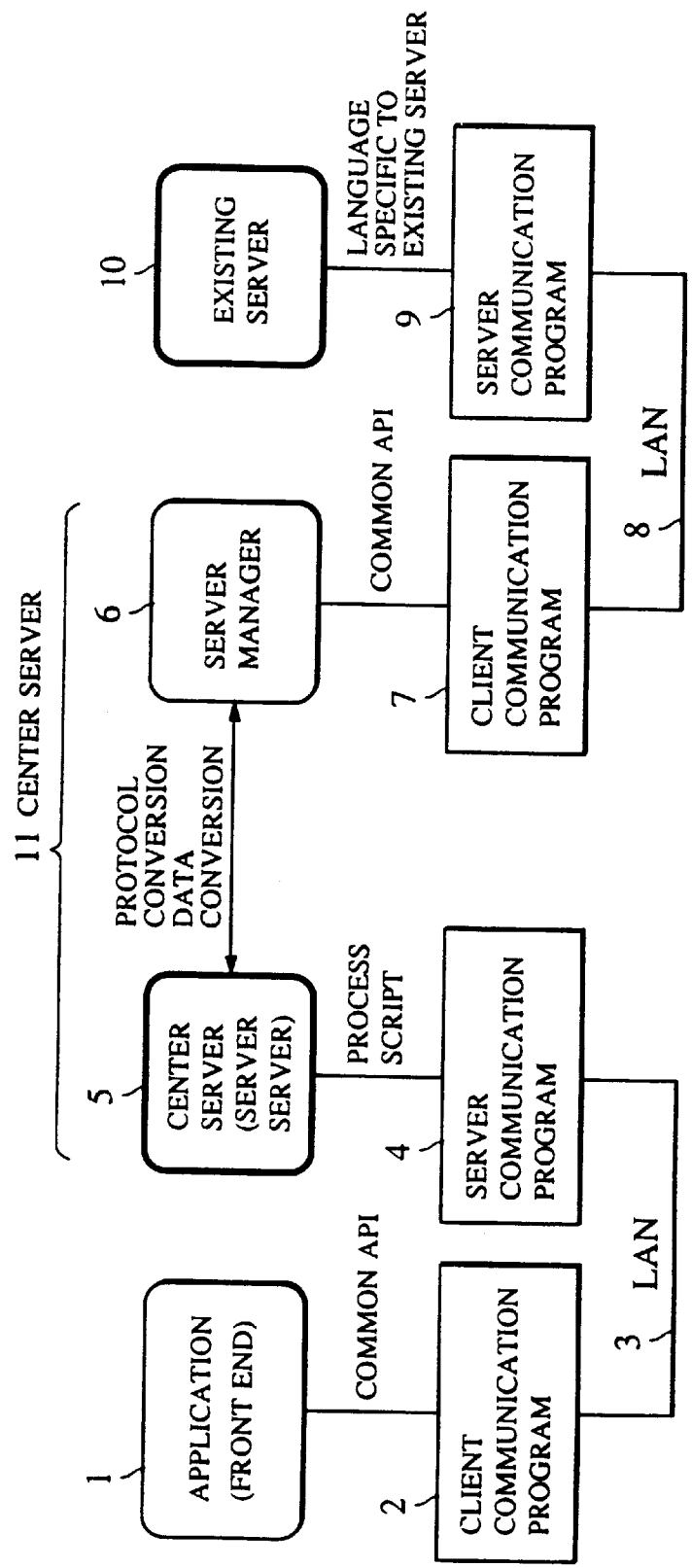
FIG. 1 is a block diagram illustrating the system configuration of a multimedia server in accordance with one embodiment of the present invention.

FIG. 1 is a block diagram illustrating the system configuration of a multimedia server in accordance with one embodiment of the present invention. This configuration, in particular, corresponds to a case in which an existing server 10 is accessed via a center server 11.

In the multimedia server described in this embodiment, a server suited to handle multimedia information is formed of an "integrated server" and a "digital exchange". One virtual integrated server is constructed on the network, and various types of services are provided.

In this embodiment, the "integrated server" refers to a server such that a group of servers distributed on the network are logically integrated, which integrated server is formed of a plurality of function servers of the conventional type for providing various services, and one center server for controlling the servers. The center server may be a dedicated server or a server shared by the client.

When the center server is seen from the client (the host computer), a group of a plurality of function servers distributed on the network is seen like one huge integrated server. Of course, each different server may be accessed individually as in the past. However, passing "process scripts" to the center server so that the subsequent operations are left to the center server so as to perform the operations is more efficient because the client is able to quickly proceed to the next operation.

Referring to FIG. 1, reference numeral 1 denotes an application serving as a "front end" which accesses the server. The "front end" will now be described briefly.

If the server and the client are present in the same computer, the application is able to directly call the functions of the server and use the functions. However, if the server is present on another computer over the network, it is not an easy matter because the application must access the server via the communication program.

In such a case, the application programmer cannot easily write a program for accessing the server. Therefore, it is common that the server vendor prepares an accessing scheme whereby the server is accessed by the same calling as when the server is present locally even if the server is on the network.

The scheme is like a part of the server, has communication functions, and is installed in the client. This small program is called a front end in contrast with the server, and it is possible for the programmer to write applications which access the server on the network without considering communications at all.

The user inputs and outputs data through an application 1. Reference numerals 2 and 4 each denote a client/server type communication program; reference numeral 3 denotes a local area network (LAN); reference numeral 5 denotes a center server which provides a standard access environment which is integrated for the application 1. The center server 5 works to provide all the services from the application 1. Since the basic function of the center server 5 is to logically integrate various existing servers, the center server 5 usually does not have primary service functions of the server. Thus, the center server 5 accesses the existing server 10 through a server manager 6 and responds to a request from the application 1. Reference numeral 7 denotes a client communication program; reference numeral 8 denotes a local area network (LAN); and reference numeral 9 denotes a server communication program, data to be handled and interfacing being not the same as the communication programs 2 and 4.

A language (command) for accessing the existing server has a language specific to each server due to the relation with the configuration of the respective servers. Therefore, the client/server communication programs 7 and 9 for accessing purposes are often all their own, and there may be a case in which the client/server communication programs 2 and 4 for connecting to the center server 5 for integrating a plurality of servers are different from the client/server communication programs 7 and 9.

The LAN 8 needs not to be the same as the LAN 3 because of the same reason. For example, the LAN 3 may be an AppleTalk (trademark), and the LAN 8 may be an Ethernet (trademark). The server manager 6 for controlling the existing server 10 works as a front end of the existing server 10, and the interface with the client communication program 7 is also an existing API.

On the other hand, the center server 5 provides an access method which is common to all the servers, and an API which is provided via the client/server communication programs 2 and 4 is also common. Therefore, protocol conversion and data conversion are performed for absorbing the differences in architecture between the center server 5 and the server manager 6.

For the above purpose, the center server 5 and the server manager 6 are present in the same computer and operate in close association. The means in which the functions of the center server 5 and the server manager 6 are integrated is a function of the center server. Therefore, the center server 5 is called a server-server when the function needs to be clearly discriminated.

Figure 2:
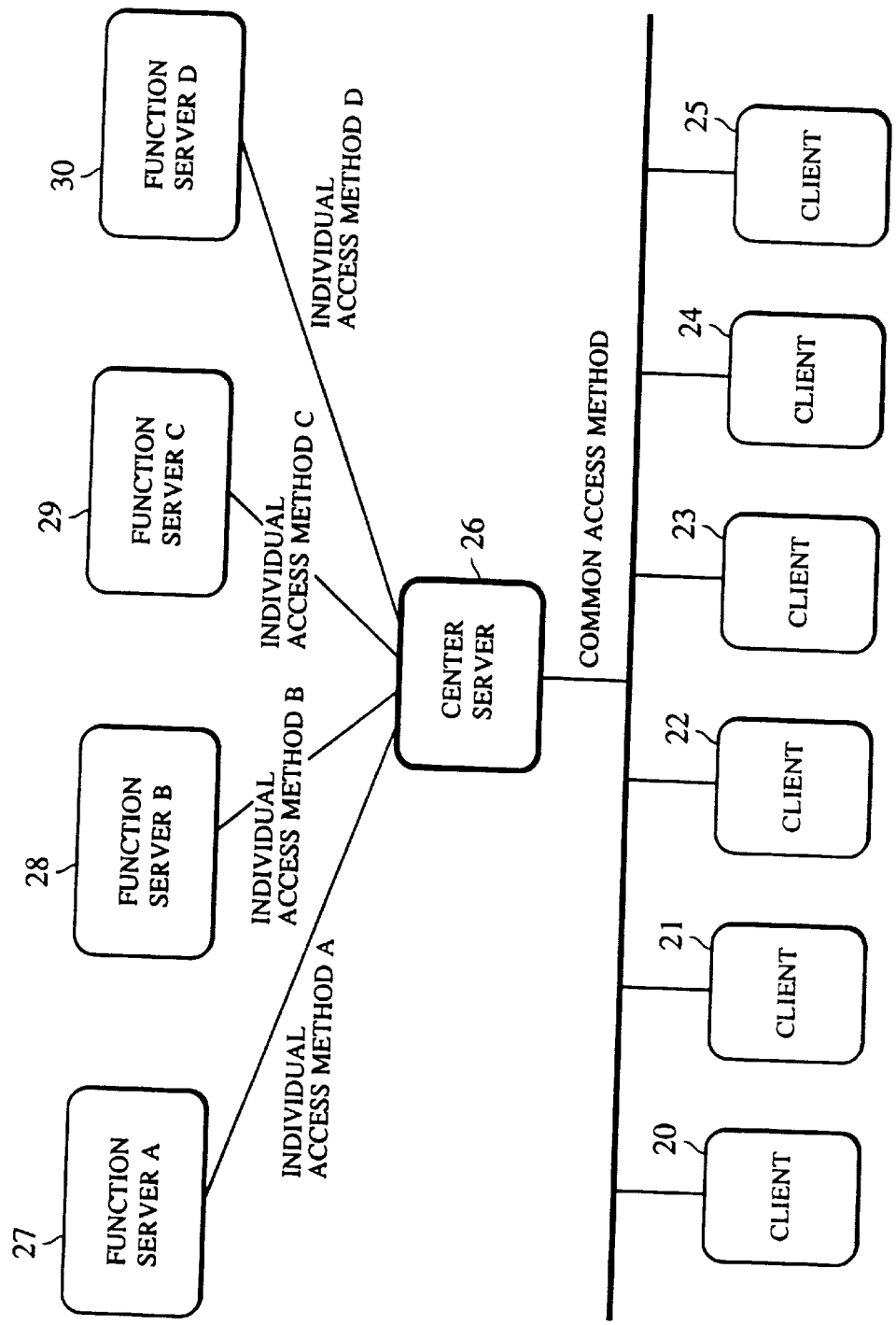
FIG. 2 is a diagram illustrating a method of accessing existing servers via the center server shown in FIG. 1.

FIG. 2 is a diagram illustrating a method of accessing an existing server via the center server 5 shown in FIG. 1.

In FIG. 2, when clients 20 to 25 access a center server 26 by a common access method, the center server accesses necessary function servers 27 to 30 through an individual access method in accordance with a request from the client. Therefore, the respective clients 20 to 25 need not to be concerned with the method of accessing the individual function servers A to D, much less the existence of the function servers A to D.

In the multimedia server constructed as described above, the center server which transfers over the network receives a message such that a predetermined process script and data are paired, which message is issued from each client, the center server interprets the received message and performs communication protocol conversion and data conversion for each function server, and the respective process script and the data are transferred over the network while the consecutive operations for each function server are handled instead. Thus, it becomes possible for each program of the client to obtain desired result data by merely transferring process scripts corresponding to the integrated function operation and data to the center server even when the center server is made to perform a plurality of functions.

The "process script" will now be explained. The process script is such that commands are written in the form of text in a basic unit at which data communication is made in accordance with communication protocols. It is possible to transmit commands and data at the same time. Since the process script is usually used for a communication between machines, there is no difference if the command is a text or binary codes. However, since a text can be read by a human being, an unusual application is possible such that a machine transmits the text to the human being via an electronic mail and the result thereof is received via the electronic mail.

The greatest feature of the process script is that the communication protocols themselves can be transmitted in the form of scripts. Thus, it is possible to establish a communication while dynamically changing the communication procedure. Let's recall that the communication procedure of a G4 facsimile. Since the service is constructed by exceedingly strict protocols, a feat such that when a facsimile document is received, the same document is distributed to some places cannot be performed within the standard protocols.

Since the process script is that the service procedure is written rather than the communication procedure, any communication method or communication media may be used, and an integrated operation can be specified easily for a terminal which understands basic services. As an example, let's consider a case in which a DTP document is printed from Japan by a printer in an office in the United States. Since the network is usually not connected, such a thing cannot be performed. In a new method, a print command issued from the DTP application is packed in a process script and delivered to the destination through the electronic mail. When the received scripts are transmitted to the script manager automatically if the party is a mail server, otherwise manually, the contents are analyzed, and a printed output appears on the printer of the office of the other party.

Since a center server which receives a message such that a predetermined process script and data are paired, which message is issued from each client, interprets the received message, performs communication protocol conversion for each function server, and transfers the process script for each function server over the network is connected to the network, it becomes possible for each program of the client to obtain desired result data by merely transferring process scripts corresponding to the integrated function process and data to the center server even when the center server is made to perform a plurality of functions.

Further, since each function server receives the process scripts from the center server receives data from the client over the network in accordance with ID information in the process scripts, it becomes possible to transfer scripts and data independently of each other among the clients and the respective function servers.

Also, since the center server connected to the network receives a message such that a predetermined process script and data are paired, which message is issued from each client, interprets the received message, performs communication protocol conversion and data conversion for each function server, and transfers the process script for each function server over the network is connected to the network, and since the exchange unit exchanges the telephone line between each client and the center server, it becomes possible to transfer integrated information in parallel in a multi-session for real-time information, such as voice information, among the clients while each function process is performed.

As a result, the operation procedure is standardized to one type of a simple integrated access such that the services of all the servers, and thus a seamless, useful server environment can be provided. For example, it becomes possible to perform a series of integrated operations such that an image received by a facsimile server is converted into codes by an OCR server and stored in a database by a file server continuously by one script. Therefore, it is possible to considerably reduce the operation required by the client side as in the past such that the client side initiates three front-end programs of a facsimile front-end, an OCR front-end and a database front-end and the operations are performed in sequence, a number of "cut and paste" and repetition of accesses to a "temporary file" are reduced.

Since independent servers distributed on the network can be integrated virtually, it becomes possible to use a number of service functions or integrated service functions easily from one application without the client considering the compatibility of each server. In addition, it is possible to provide a method which integrates a method of accessing a server apparatus, which method has hitherto been developed separately in individual companies and industry fields, and which accesses the server having different existing interfaces on the network by one integrated access method. A description will be given below in detail for each embodiment.

Figure 3:
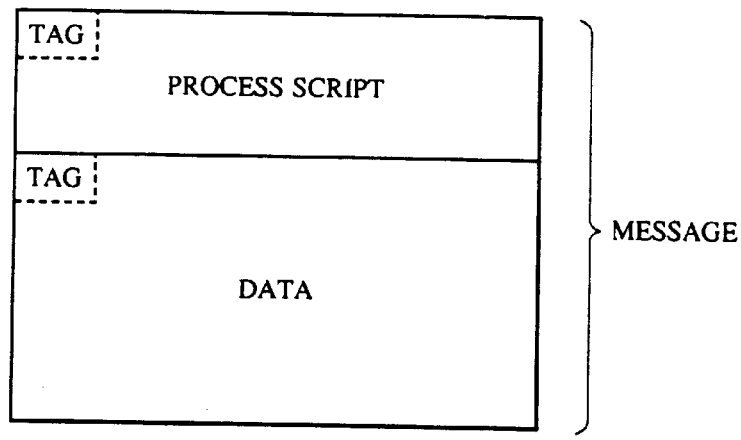
FIG. 3 is a diagram illustrating the structure of a message in a multimedia server in accordance with the present invention.

FIG. 3 is a diagram illustrating the structure of a message in a multimedia server in accordance with the present invention.

As shown in FIG. 3, the message in this embodiment is formed of a process script fork (process script) and a data fork (data). The process script and data have a tag element (tag) having contents common to them.

In this tag, "time" when the message is created, "life time" when the message will be erased, a series of "ID numbers", "type" of data, "sign" of the application from which the data is created, and the like are written. Of these items, "ID numbers" are indispensable, but other items are optional.

Figure 4:
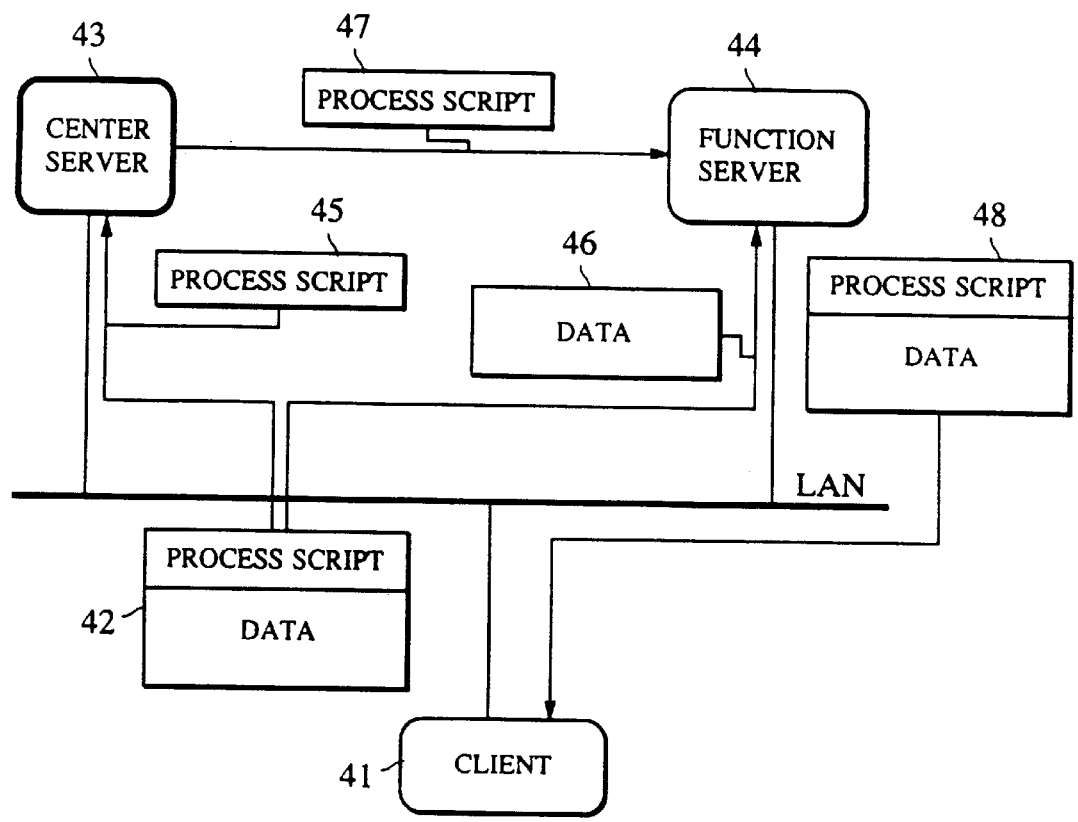
FIG. 4 is a block diagram illustrating the procedure of transmitting a first process script in the multimedia server in accordance with the present invention.

FIG. 4 is a block diagram illustrating the procedure of transmitting a first process script in the multimedia server in accordance with the present invention.

In general, in most cases, a client 41, a center server 43, and a function server 44 are all on the same LAN. When the function server 44 is a server which can understands process scripts in conformity with the present invention, the center server 43 indicates that fact to the client 41, the client 41 separates a message 42 to a process script 45 and a data fork (data) 46 and transmits them to the function server 44 and the function server 44, respectively. The center server 43 edits the received process script 45 as required, after which a new process script 47 is transmitted to the function server 44. Since both the client 41 and the center server 43 are clients for the function server 44, the function server 44 combines the process script 47 and the data 46 which have been received separately, performs necessary operations on the data, and sends back a result message 48 to the client 41 over the LAN.

In this embodiment, the process script is a program list such that the procedure for performing a series of operations is written by the center server 43 by using a group of function servers 44. The center server 43 performs a series of operations in accordance with the program list and sends back only the result message 48 to the client 41. Thus, the load of the client 41 is considerably smaller than a conventional case in which a group of function servers are accessed individually.

The process script is sometimes automatically created by a device driver of the client 41. The process script is merely an assembly of a series of function calls of the communication protocols for the client 41, is a script language created from within the series of communication protocols for the center server 43, and is communication protocols themselves for the group of function servers 44.

The feature of the process script is that the arrangement of the conventional computer communication can be broadly classified into the following: real-time processing, and batch processing.

The batch processing is a method often used for processing by a large computer (mainframe) in which when operations are centralized by a number of users, the jobs are spooled sequentially in a queue, the operations are processed sequentially and the results are sent back to the user. There is a drawback in that when the result is output cannot be known, and when it is strongly desired to see the progress, the queue must be looked into.

In the real-time processing, a scheme by which the progress can be known at any time by exchanging the process scripts is prepared, and a necessary operation in the process is performed.

Although the real-time processing looks convenient at first sight, conditions are imposed that the network must also be a real-time system. When, for example, the network is of a "stored forward" type like Internet, and when several hubs are relayed, a delay of several minutes occurs each time of the relay. In such a network, real-time processing cannot be used.

The process script is a communication method which is most suitable for such a "stored forward" type network and has a characteristic which is intermediate between real-time processing and batch processing. The script means "writes". The command is written in the form of text, and the protocols are made easier to such an extent.

Figure 5:
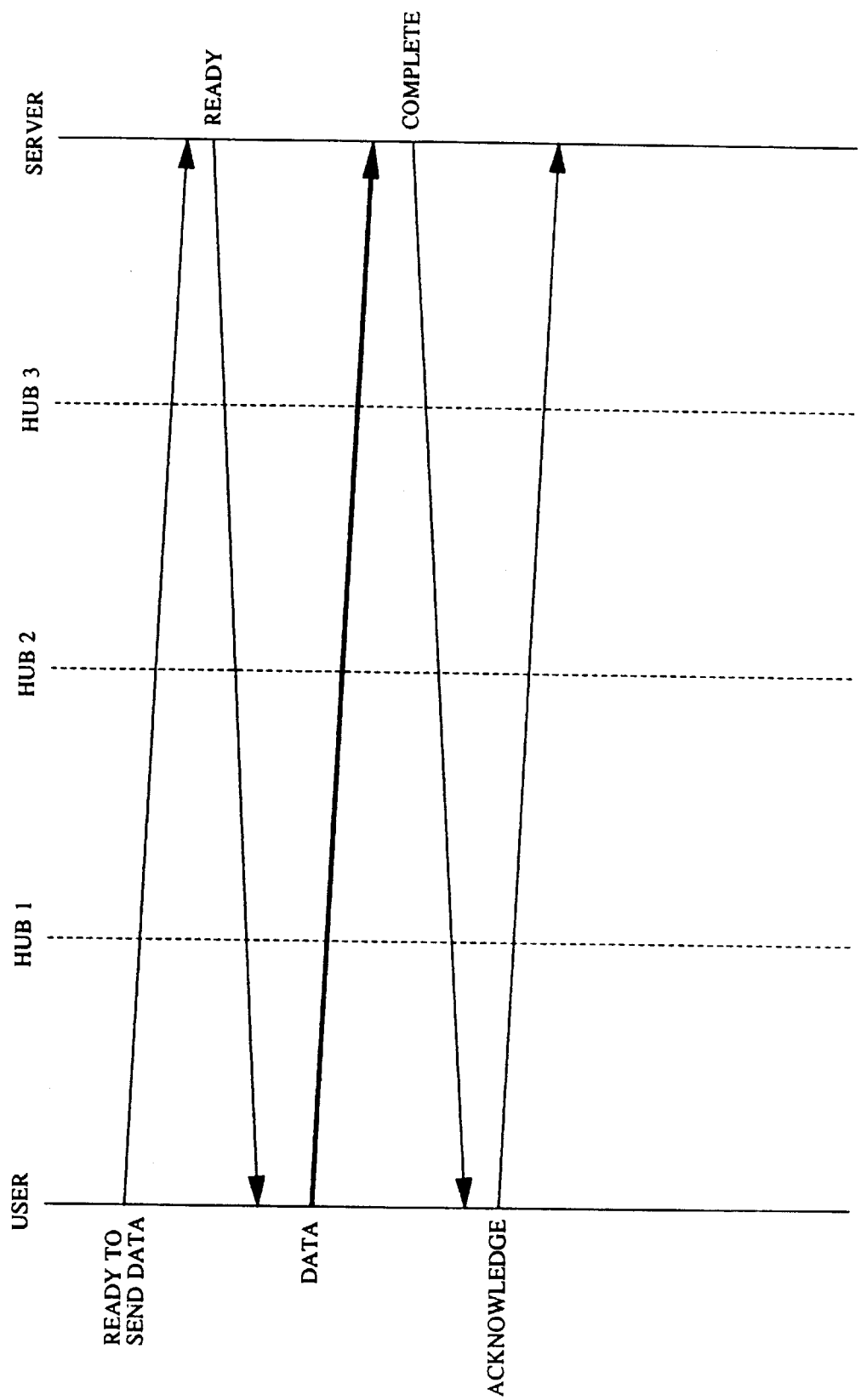
FIG. 5 is a chart illustrating real-time processing in accordance with the present invention.

An example of real-time processing is shown in FIG. 5. When a user issues a command of "ready to send data" and a response of "ready" is received from the server, the user sends "data" and sends a delivery confirmation of "acknowledgement" in response to the response of "complete". The reason why such protocols can be used is due to the end to end communication between the user and the server without no hubs in between.

Figure 6:
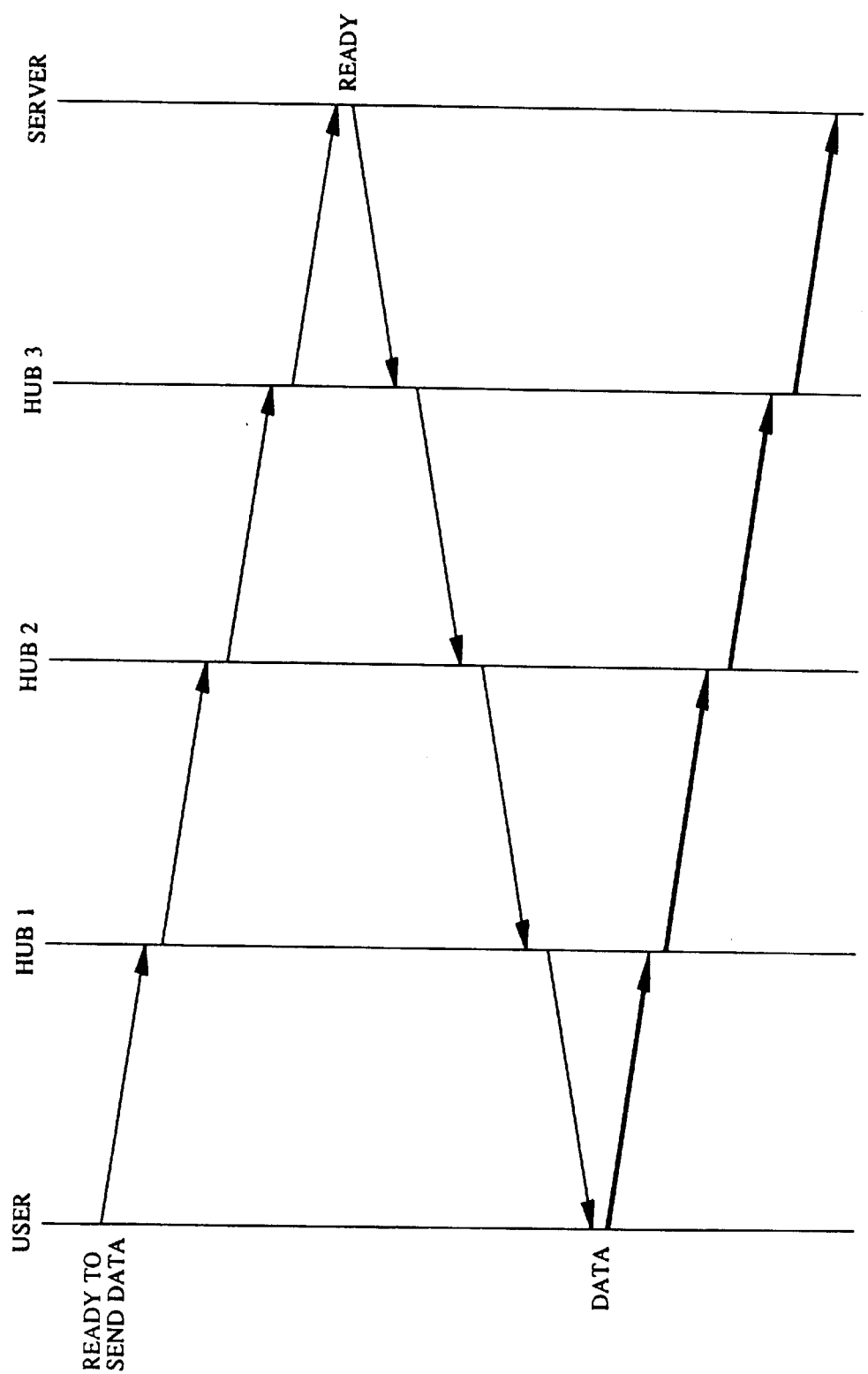
FIG. 6 is a chart illustrating another real-time processing in accordance with the present invention.

A communication through the hubs 1, 2 and 3, as shown in FIG. 6, will now be explained. Delays are accumulated in sequence from the time of "ready to send data" to the time of "ready", and it is no easy matter to reach a stage for "data" transmission. In the meantime, some communication connection is disconnected due to timeout or the like. Thus, this communication cannot be made practical at all.

Figure 7:
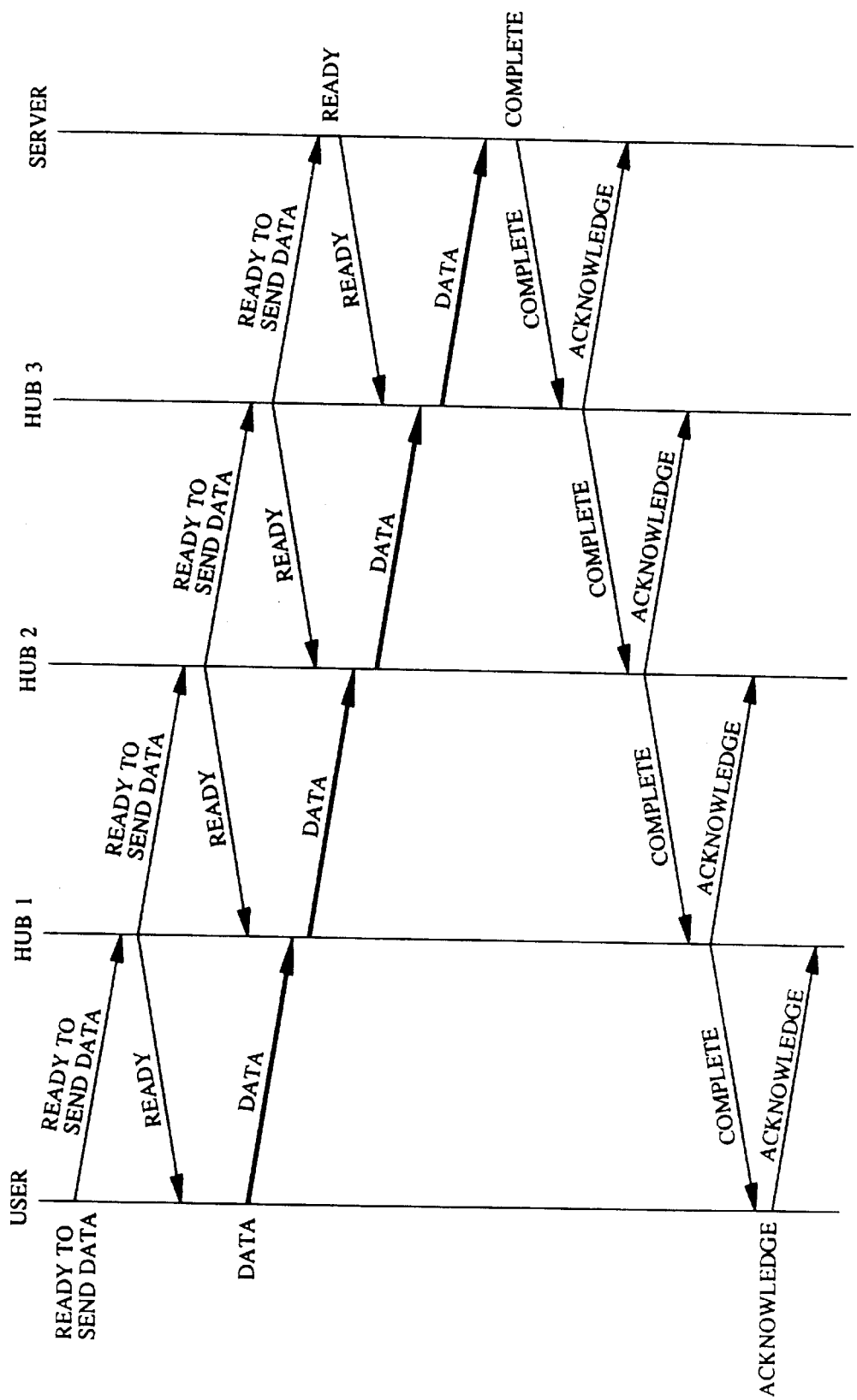
FIG. 7 is a chart illustrating batch processing in accordance with the present invention.

FIG. 7 illustrates an example of batch processing in which the "stored forward" type network is taken into consideration. The response of "ready" in response to the "ready to send data" is received from a near hub. If this is done, "data" can be sent relatively earlier. However, even in this method, a recovery routine for a case in which some kind of communication error occurs in the middle is stupendously complex. A case in which "ready to send data" is lost in the middle can possibly be managed, but if the response "ready" is lost, the recovery thereof is probably impossible.

Figure 8:
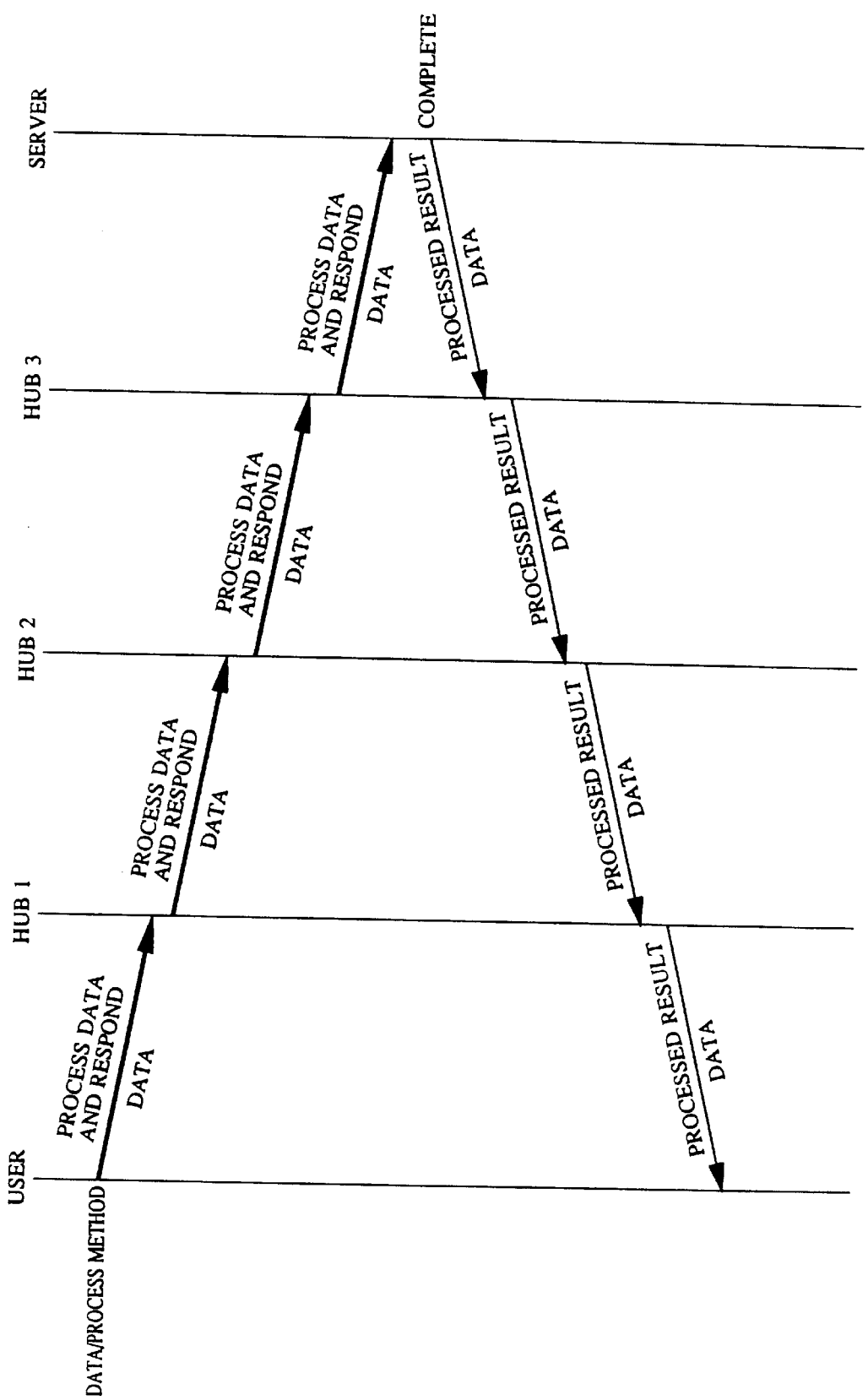
FIG. 8 is a chart illustrating a communication method employing process scripts in accordance with the present invention.

FIG. 8 illustrates an example of a communication method employing process scripts in accordance with the present invention. The command of "process data and respond" and "data" in a set are sent in turn. Since the command of "processed result" and the processed "data" in a set are sent, there is no communication method more quick than this communication method in this network. Even when the process script is lost due to an abnormal communication, the recovery is easy because the command and the data are in a set.

Figures 9, 10A, 10B:
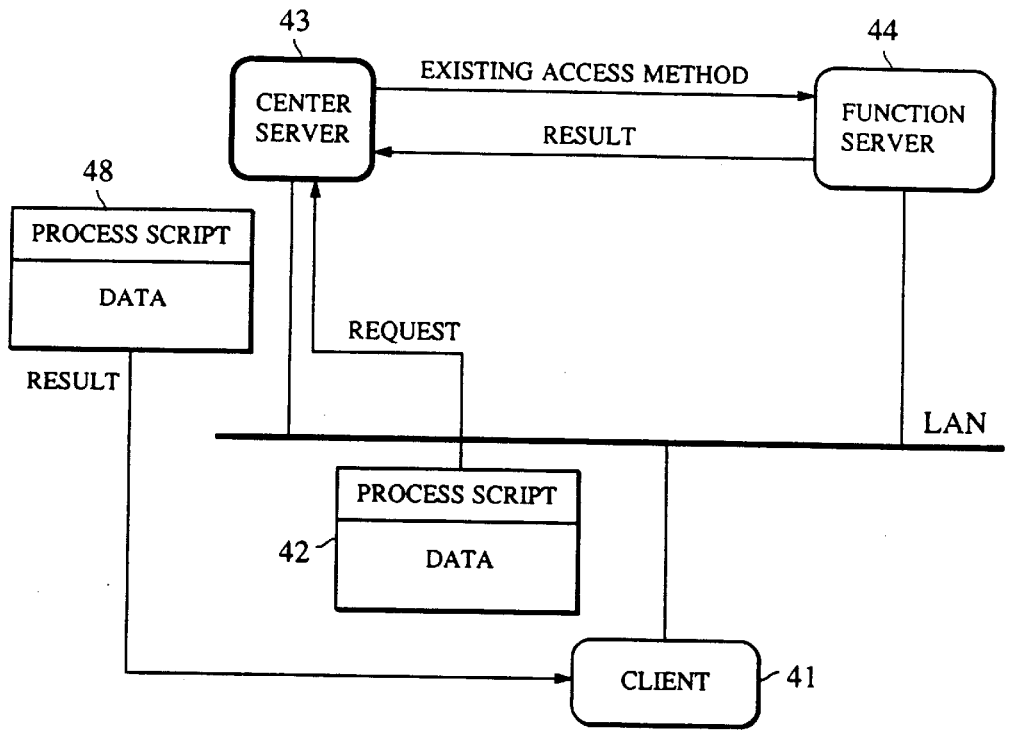
FIG. 9 is a block diagram illustrating the procedure of transmitting a second process script in the multimedia server in accordance with the present invention.

FIG. 9 is a block diagram illustrating the procedure of transmitting a second process script in the multimedia server in accordance with the present invention, showing, in particular, an access method when the function server is an existing server. Those components in FIG. 9 which are the same as those in FIG. 4 are given the same reference numerals.

In FIG. 9, the process script and the data of the message 42 are sent as a request without being isolated to the center server 43. When the requested function is not present in the center server 43, the function server 44 which performs the function instead is searched, the request of the client 41 is transmitted to the function server 44 by an existing access method, and the result is received. The result is sent back as the message 48 to the client 41 <communication protocols>.

One role of the center server in the multimedia server is to standardize different access methods of various servers. When the application accesses the center server having a standardized interface, access to individual servers is performed by the center server instead from that point. Items to be standardized, when broadly classified, are standardization of data and standardization of an access method.

The number of standardizations of data is not one, but more than one. Data is standardized by an industry standard format which is independent of a specific application, and exchange with non-standard data is allowed.

Main formats currently in use are: QuickDraw, GDI, RTF, TIFF, PICT, Bitmap, PostScript, EPS, G3/G4, PCL, HP-GL, ANSISQL, ASCIIText, UNICODEText, and Binary Data (trademarks and product names).

On the other hand, the standardization of the access method is nearly unified. It is possible to easily use various services in an integrated manner by the unified access method.

However, the industry standard access method cannot help being supported. On the other hand, as explained with reference to FIG. 3, the contents to be transmitted is a message, that is, "process script" and "data" are in a set. "Data" is information itself to be processed, and "process script" is a command sequence in which how that information is to be handled. The set of "process script" and "data" are transmitted among the servers, and necessary operations are performed one after another. By standardizing the method of exchanging "process script", it is possible to access various servers by the same access method.

The center server 43 works as a gateway for the server having different protocols. For example, a function call for accessing the facsimile server, the contents shown in FIG. 10(a), are issued from the client 41. As a result, the scripts shown in FIG. 10(b) are passed to the center server 43.

FIGS. 10(a) and 10(b) show examples of scripts which are used in FIG. 9. FIG. 10(b) shows a script portion which is actually sent to the network. In this case, since a G3 facsimile is used as an example, MMR data flows, but the illustration thereof is omitted.

The address (server) of the server and the service type (fax_service) are specified by MM_open. The fact that the type of fax_service is G3 is specified by MM_send. The destination Fax number (destination) is also set.

The size (length) and contents (content_buffer) of the transmission data buffer are sent by MM data. This service is terminated by MM close. Since the process script is flexible, it is used in a manner close to the real-time system at this time.

FIG. 11 shows in detail the sequence which is written in a simplified manner.

The communication protocols among the application, the client and the center server conform to the procedure shown in FIG. 11.

There are the following two methods for the access sequence. The first one is a stored forward type which is store-and-forward switching. When the pair of the process script and the data is completely transmitted, the communication is temporarily terminated regardless of the success/failure of the process result, and the final processed result is examined by restarting the communication again. When the operation is completely entrusted to the server, the client side is able to proceed to the next operation, and thus the use efficiency of resources is increased.

The second one is a real-time method in which the connection of the communication is ensured until the final processed result is determined. Although this method has the drawback in that the operation of the client is restricted, the operational reliability is high.

Next, a description will be given below of the function processes of a digital exchange in this embodiment.

The digital exchange of this embodiment is an exchange for controlling the public switched network and the local switched network, and performs call control in accordance with a connection instruction from the center server 43. By making a second connection having no delay via the local switched network among a plurality of clients connected with delay via the LAN, it is possible to transmit information (voice) requiring real time response.

Figure 12:
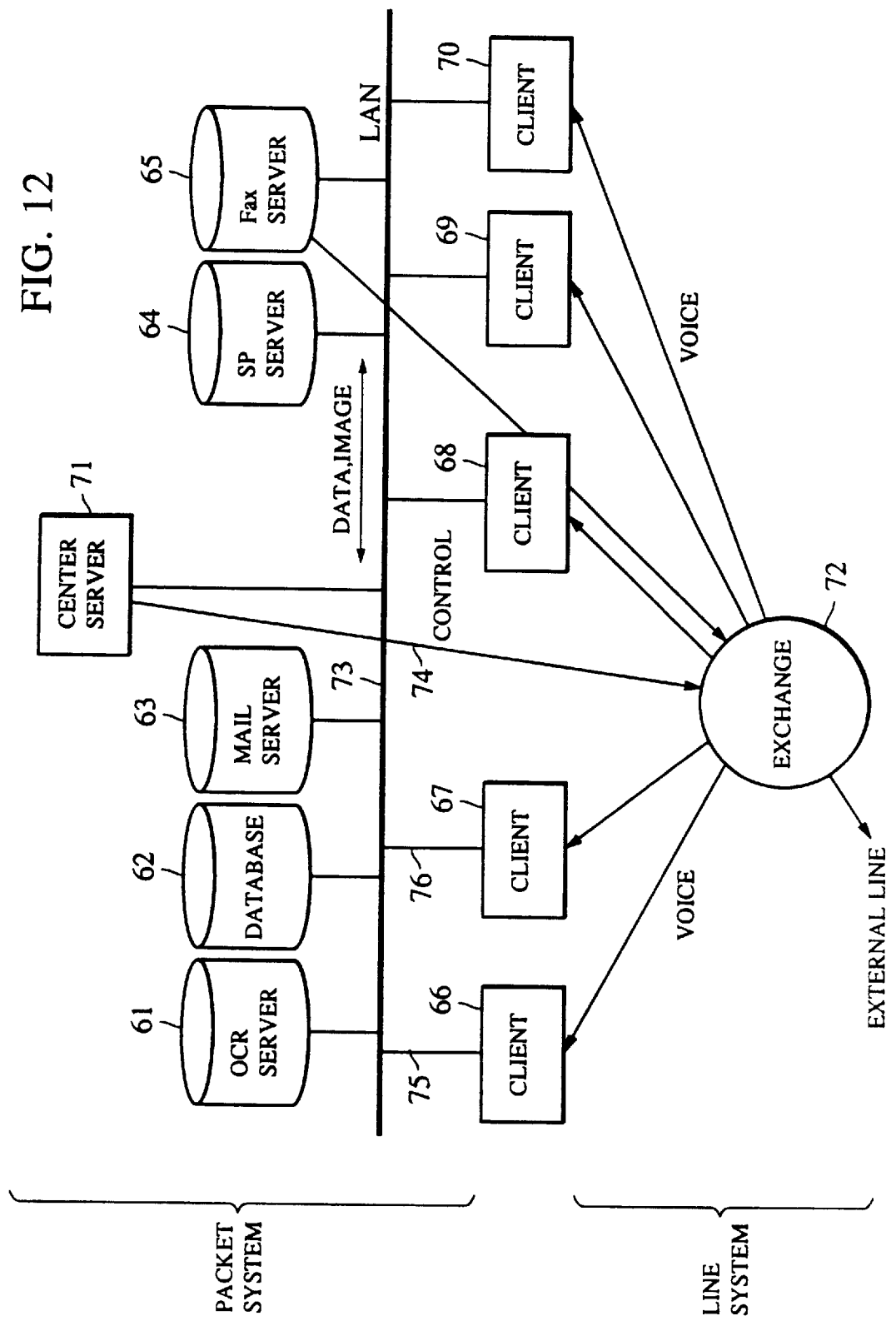
FIG. 12 is a block diagram illustrating the system configuration formed of the center server and the multimedia server to which an exchange is connected.

FIG. 12 is a block diagram illustrating the system configuration formed of the center server and the multimedia server to which an exchange is connected in accordance with the present invention, which is an application example of FIG. 2.

Referring to FIG. 12, reference numerals 61 to 65 denote various function servers; reference numerals 66 to 70 denote clients; reference numeral 71 denotes a center server for integrating the respective function servers 61 to 65; reference numeral 73 denotes a local area network (LAN); and reference numeral 72 denotes an exchange (PBX) for switching the telephone line of the extension/external line. Since data is formed into packets and transmitted through the LAN 73, this data transfer is not suitable for real-time transmission, such as voice or moving images. However, by utilizing the feature that all the clients are always connected, this data transfer is suitable for data transfer which does not require connection control and broadcast communication.

On the other hand, the PBX 72 is suitable for real-time transmission of voice and moving images. By taking full advantage of the feature of the LAN and the PBX, it is possible to construct a personal computer conference system (PC conference). A case in which an access to the client 67 is made from the client 66 so as to conduct a PC conference will now be considered. The client 66 issues to the center server 71 a start command script for starting a PC conference with the client 67. The center server 71 issues a script for connecting with the multimedia client demon (MCD) of the client 67 and instructing the start of the PC conference. In this example, the demon refers to a program which runs always in the background. Since the ID number of the PC conference is written in the script, by sending scripts to the destination of that ID number thereafter from the clients, data communication is possible among the clients.

At the same time, the center server 71 accesses the PBX 72 via a control line 74 in order to connect the telephone sets near (or built in) the clients 66 and 67 so that voice can be transmitted. In this way, the operators of the clients 66 and 67 make a conversation by voice while watching the common screen of the computer, and thus a PC conference is conducted. The PC conference needs not to be a one-to-one connection, and a plurality of clients may be connected at the same time.

As a result, a LAN in which a packet transmission is in the main and which is not suited for real-time data transmission, and an exchange which is suited for exchange between voice and moving images and which is not suited for broadcast communication and intelligent control are interconnected each other, and thus it is possible to construct a personal computer conference system without adding special optional parts to a commercially available personal computer.

Service functions using a high-speed data highway will now be explained below.

Although in this embodiment a system construction is considered by assuming components which are relatively easy to obtain today, data packets and voice lines may be multiplexed when a network having a transmission rate of 100 Mbps or more, such as FDDI (Fiber Distributed Data Interface: United States ANSI standard) can be used.

Also, although in this embodiment ISDN is assumed as a public network connected to the exchange PBX, B-ISDN may be used. When the United States SMDS-class public network can be used, the LAN-side connection may be connected to the outside.

When the speed may be sacrificed a little, an inter-LAN connection may be connected through the ISDN network like UNIX's SLIP (SerialLineIP). Even at the current technology, use of an ISDN router makes an inter-LAN connection possible over the ISDN network.

Examples of the services to which the present invention can be applied are shown below.

(Field)—(Service)
Printing—Color printing
Scanning—Color scanner
OCR—OCR, file keeper, voucher processing
Translation—Japanese/English
File system—NFS
Database—text, still image, moving image, voice
Conference system—shared window+real-time voice
Mail—text, still image, moving image, voice
Contribution system—still image, moving image, voice
Image processing—CMM, filtering, image processing accelerator
Fax—Fax transmission/reception/distribution
MHX—text, Fax, CATS
Reservation system—conference room reservation.

As regards the service function process, this embodiment will be explained below in comparison with the prior art by using the OCR service as an example.

The operation will now be considered in which 10 documents are scanned by an OCR and converted into character codes, and saved as a text file in a disk of a data server.

In the prior art, a document is scanned by a scanner and transmitted to a client. The image data is retransferred to the OCR server, applied to an OCR in order to convert the image data into text data, the text data is transmitted to the client, and the text data is transferred to the disk of the data server. The above is repeatedly performed for ten times.

On the other hand, in this embodiment, the client transmits a process script to the center server (the document is scanned by the scanner→transmits to the OCR server) (applied to the OCR in order to convert to text data) (text data is transferred to the disk of the data server) center server →notifies the client of the result.

In the prior art, four times of data transfer intervened by the client is required. Since as much as 10 documents are not scanned at a stretch by a conventional personal computer because of the limitation of the capacity of the hard disk, 40 data transfers are required at worst. In contrast, only two data transfers intervened by the client are required, and all the others are communications among the servers. The whole data transfer is reduced. Data communication/processing which is not related to the client are indicated by the parentheses. Since reduction in the number of times of data transfers indicates a reduction in the number of times the computer is operated, the operation can be automated considerably.

As regards the service function process, this embodiment will be explained below in comparison with the prior art by using the scanning service as an example.

An operation will be considered in which a document of an A3 size is scanned in a full color at 400 dpi by a network scanner, color processing is performed on the image data, and the image data is printed by a print server.

In the prior art, scanning of a document→image data is transmitted to the client→color processed image data→the image data is transmitted to the print server whereby the image data is printed.

On the other hand, in this embodiment, client→process script is transmitted to the center server (scanning of the document) (image data→color processing) (color processed image data→transmitted to the print server) (print) center server→notifies the client of the result.

Since a normal personal computer is limited by the memory capacity, actually, the prior art is merely a desk calculated value. In reality, there is almost no such OS capable of managing such a huge main memory of 96 MBytes.

As regards the service function process, this embodiment will be explained below in comparison with the prior art by using the mail service as an example.

A case in which a moving-image file is transmitted to the server and the presentation of the moving image is made.

In the prior art, a huge moving-image file→transmitted to the server

In this embodiment, client→transmits moving-image scripts to the center server (center server to function server communication) center server→notifies the client of the result.

Moving-image files are generally very large in size. In some cases, a movie of tens of minutes exceed one Gigabytes.

To handle data of such a size, it is necessary to expand the memory and/or a hard disk of the client of the conventional client and, in some cases, to replace the CPU unit to a high-speed one.

However, in this embodiment, since the server stores moving-image data, it is not necessary to expand the memory and/or a hard disk of the client, and the CPU may be a slow-speed one. If process scripts are issued to the multimedia server (center server) over the network, the reproduction of the moving image is performed by the server instead.

As regards the conference system function process, this embodiment will be explained below in comparison with the prior art by using the mail service as an example.

A plurality of clients are connected to each other at the same time, one file is opened, an electronic board which can be written from anywhere is prepared, the exchange is accessed at the same time so that the respective extension telephone sets are connected to each other, and thus a PC conference is conducted.

In the prior art, a system, such as text-based conference system in which no voice is used In this embodiment, client→transmits process scripts for conference to the center server (the center server to function server communication) (PC conference among the clients) client→transmits a termination process script to the center server→the center server→notifies the client of the result.

Figure 13:
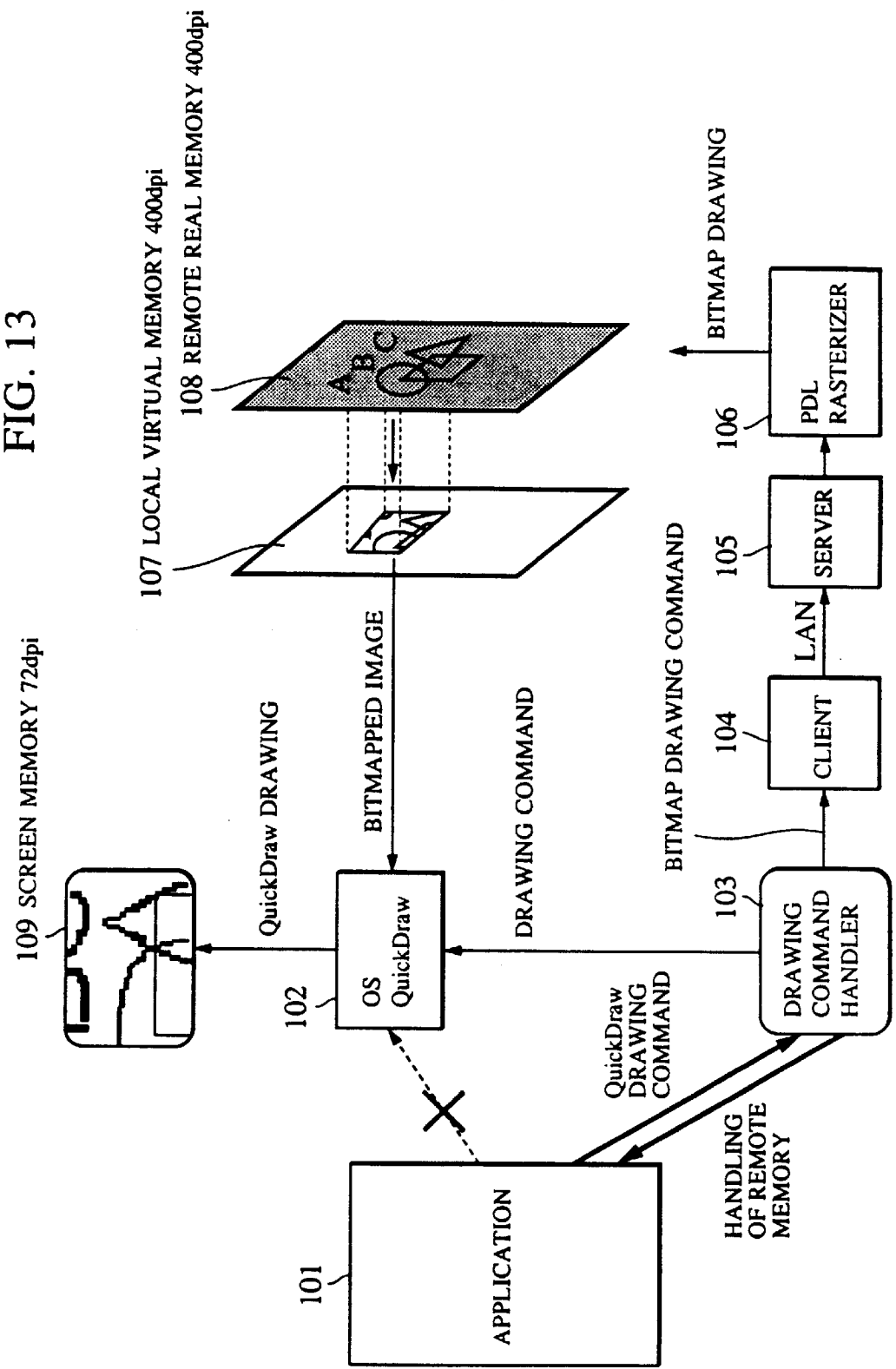
FIG. 13 is a block diagram illustrating the configuration in which the multimedia server is made to work as an image drawing accelerator in accordance with the present invention.

Referring to FIG. 13, a description will be given below of a case in which the multimedia server in accordance with the present invention is made to work as an image drawing accelerator.

FIG. 13 is a block diagram illustrating the concept of a case in which the multimedia server is made to work as an image drawing accelerator in accordance with the present invention. This embodiment, in particular, is concerned with a case in which the multimedia server is used as an image drawing accelerator for a computer (Trademark: Macintosh) of Apple Computer Corporation.

For example, to edit a full-color bit-mapped image of B5 at 400 dpi, the main memory requires tens of megabytes, and thus a conventional personal computer is not capable of editing such an image. Even if the virtual memory function offered from the up-to-date OS is used, a full-color image of A4 at 400 dpi or thereabouts is a limit in terms of processing speed. On the other hand, since the multimedia server of this embodiment is used as a virtual memory on the network, it is possible to edit a full-color high-resolution image of A3 or so.

The virtual memory will now be explained. The virtual memory is a technique to use a huge memory. The real memory usually refers to a semiconductor memory (or main memory), and only a part of the huge memory size required is present. In contrast, the virtual memory refers to a hard disk or the memory (or an auxiliary storage) of the server on the network. The access speed thereof is slow, but has a huge memory space. Such a method is called a virtual memory that main storage and auxiliary storage are well combined, and the whole memory space is seen as if it is a uniform and seamless space when seen from an application.

When the application accesses a portion not present in the main storage, the memory controller detects an error, the current information of the main storage is saved in an auxiliary storage, and necessary information is loaded from the auxiliary storage to the main storage in a reverse manner, and swapped in the memory space that the addresses of the main storage are requested. Thus, when seen from the application, it looks as if a huge memory is actually present.

Specifically, an application 101 always sends a drawing command to a drawing control program (product name: QuickDraw) 102, a part of OS, when something is to be displayed on a monitor in order to request to rasterize a screen memory 109. There is no case in which the application directly accesses the image memory.

When, on the other hand, a bit-mapped image is to be displayed on the monitor, a buffer memory for drawing is allocated usually under the responsibility of the application, and the image is drawn there in the background, after which a request to transfer memory is issued to the QuickDraw 102. Accordingly, the buffer memory for drawing is under the control of the application, and setting the real memory on the hard disk by using the buffer memory as a virtual memory has hitherto been performed.

In this embodiment, the real memory is provided in the multimedia server on the network, and when the screen is updated, a partial copy is made in the local memory.

Reference numeral 103 denotes a drawing command handler which is an application program interface (API) for passing the functions of the multimedia server to the application on the client side. The application 101 passes to the API the same parameter as the call to the QuickDraw so that the image is written in the memory allocated in the server on the network.

Since the application is not necessarily designed by considering the multimedia server, the function call to the application 101 or the QuickDraw 102 may be hooked to forcedly pass the control to the drawing command handler 103. All the function calls of QuickDraw are performed by exception handling, and the handling can be easily branched. In such a case, the drawing command for the image memory is passed through the QuickDraw. Needless to say, the application designed by considering the multimedia server is more efficient in drawing than the application designed without considering the multimedia server.

The bitmap drawing command for the memory is sent to a PDL rasterizer 106 via a client 104 and a server 105 where the bitmap drawing command is rasterized into bitmap data and written in a remote real memory 108 in the multimedia server. The remote real memory 108 has a capacity for storing all the bitmap data for one page, while the capacity of the local virtual memory 107 is limited.

The local virtual memory 107 virtually overlaps the remote real memory 108. The portion where the memory is allocated actually is only a limited area which is being currently edited. If the area which is being edited is changed, the image data in a new area is copied from the remote real memory 108. As a result, an image editing operation which is usually impossible in the past, such as edition of a full-color image of A3 at 400 dpi because of the limitation of the memory capacity, can be processed from an inexpensive terminal by using the resources on the network.

Figure 14:
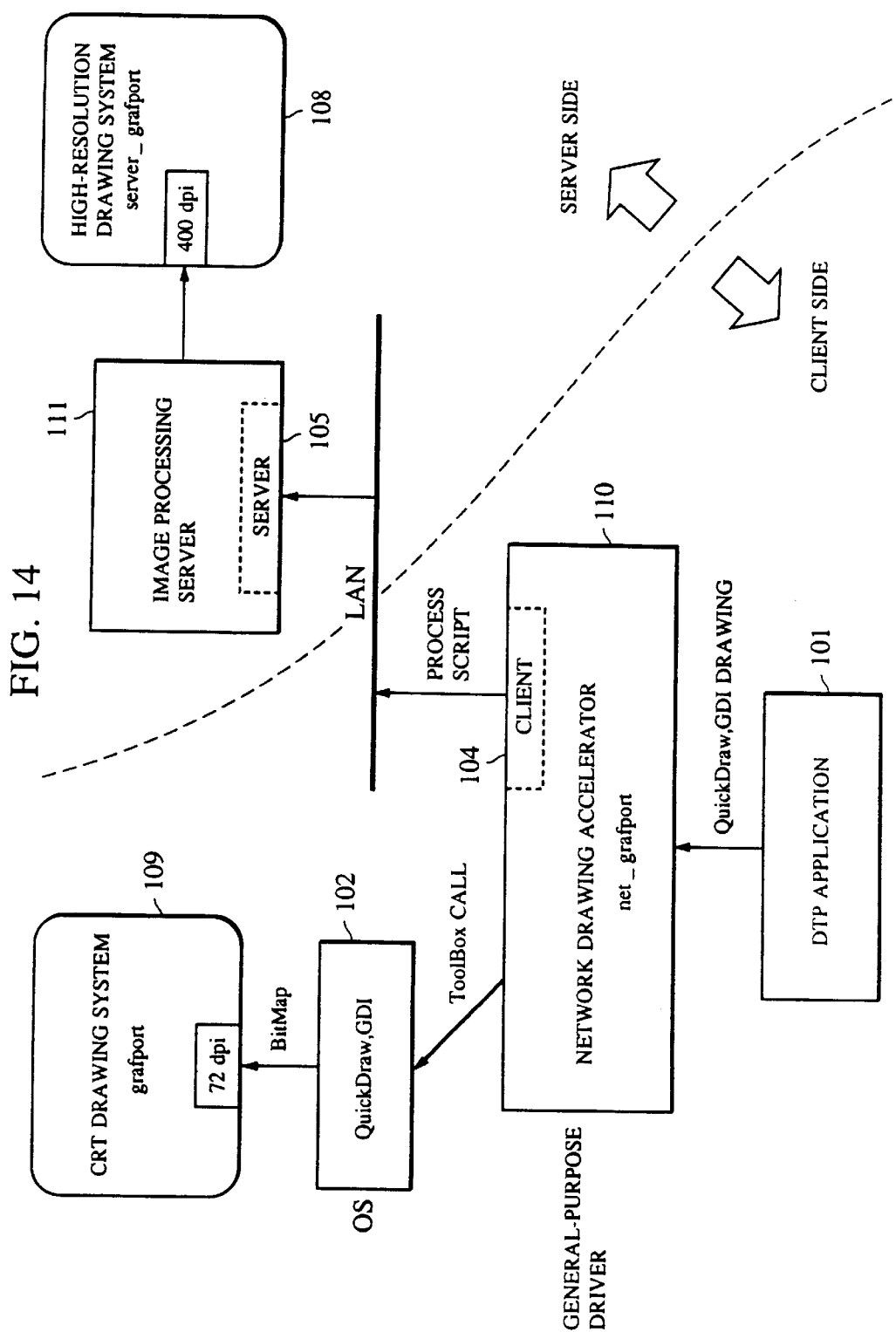
FIG. 14 is a system block diagram of the image drawing accelerator in accordance with the present invention.

FIG. 14 is a block diagram of the image drawing accelerator in accordance with the present invention. The side on the right of the dotted line is a server side, and the side on the left of the dotted line is a client side. Those components in FIG. 14 which are the same as those in FIG. 13 are given the same reference numerals.

An example in which the client is a Macintosh (product name) will be explained. In the normal use, when the application 101 draws on the screen, the application 101 calls a screen memory control system 109 called grafport in order to allocate a drawing port. The screen buffer memory allocated by grafport is of a bitmap system, and the resolution of the screen buffer memory is 72 dpi (dot/inch).

The application 101 is capable of calling a series of screen-server functions called QuickDraw (product name), and usually control is passed to the OS 102 in the form of a ToolBox call (a system call of OS). The OS rasterizes the received screen drawing function call into a bit map and draws in the grafport.

In the present invention, the ToolBox call of QuickDraw is hooked (stolen) so that the control is temporarily passed to a network drawing accelerator 110 (net_grafport), causing a ToolBox call to be issued again. The network drawing accelerator 110 shows the portion including drawing command handler 103 and the client communication program 104.

In this example, the client communication program 104 is a communication program which merely provides communication means, and the client side refers to the whole of the left from the dotted line in the figure. The same holds for how the server side and the server are called, and in some cases, they refer to only the communication program, and in some cases, the server refers to the whole of the right from the dotted line.

The network drawing accelerator 110 converts the Tool-Box call of QuickDraw from the application 101 into process scripts and transmits them also to a network drawing accelerator server (the server side) over the LAN. A network drawing accelerator server 111 receiving the process scripts draws the same image as for the client in the high-resolution drawing system 108 (server_grafport) at a high resolution of, for example, 400 dpi (dot/inch). At the same time when drawing in the local screen memory (the buffer memory managed by the screen memory control system 109) is completed, the drawing of a high-resolution image has been completed on the server side. If necessary, it is possible to print and output the image as it is, and to print it on a film.

Figure 15:
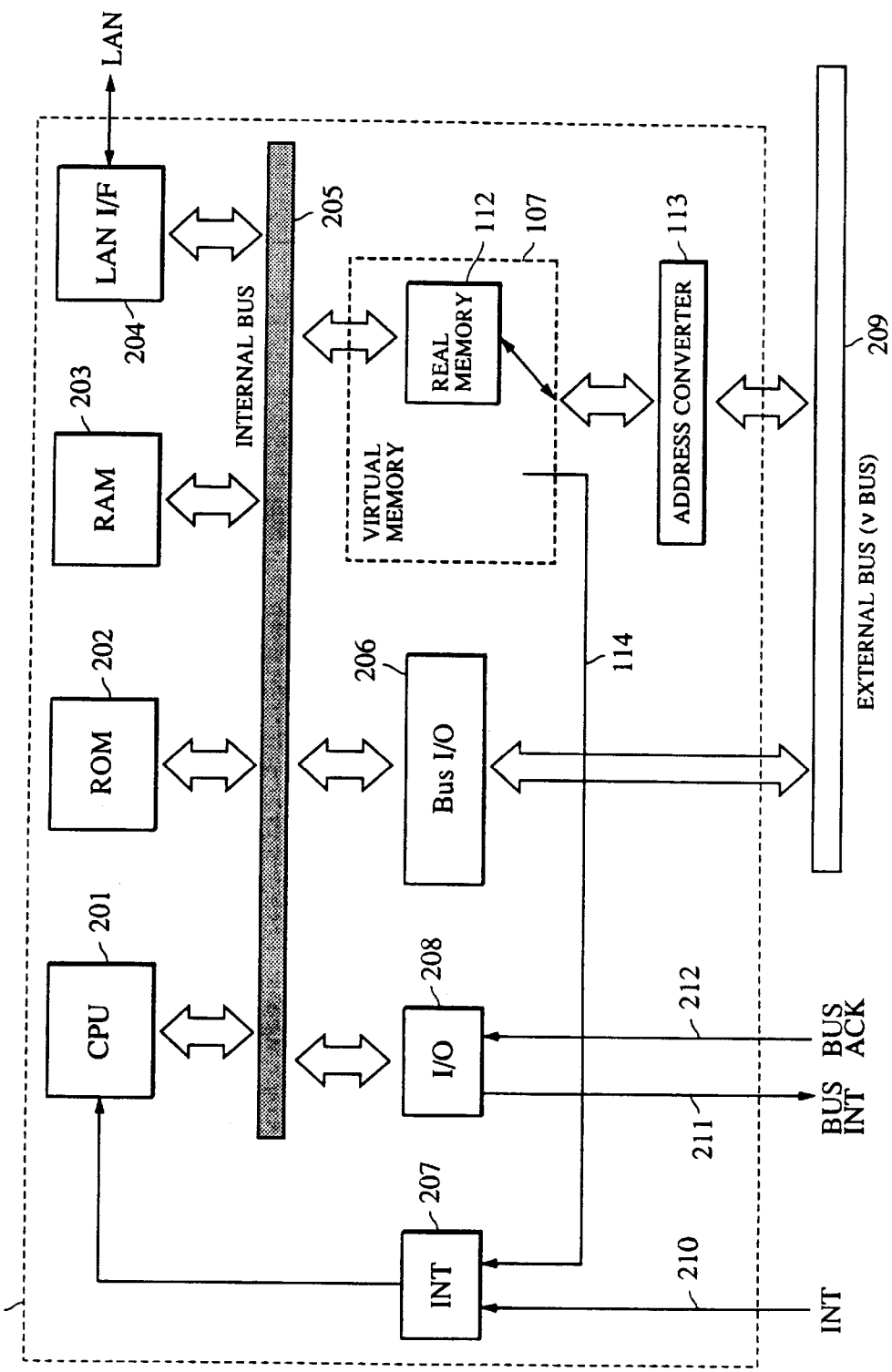
FIG. 15 is a specific block diagram of a network drawing accelerator in accordance with the present invention.

FIG. 15 is a block diagram of the network drawing accelerator 110. Although it is possible to realize the whole client side by means of software, it is also possible to realize the whole client side by means of hardware using accelerator board in order to achieve a faster processing speed. This accelerator is inserted into the bus (ubus) 209 of the computer of the client in the form of a board. A bus I/O 206 is a bus input/output for connecting an internal bus 205 inside the board and an external bus 209 and for arbitrating them. A CPU 201, a ROM 202, a RAM 203, and a LAN I/F 204 are connected to each other through the internal bus, thus a microcomputer is formed.

An interrupt handler 207 is used to guide an interrupt signal line 210 of the computer body of the client to the CPU 201 on the board. A BUS INT signal 211 is output to the mother board via an I/O 208, and is a control line for requesting the CPU of the computer body of the client to use the bus. A BUS ACK signal 212 is a control line for informing whether the bus has been released.

When the application issues a drawing command, some QuickDraw routine is called, and an interrupt (INT) occurs. Therefore, that signal can be detected via the interrupt signal line 210. The CPU 201 causes the I/O 208 to be enabled to grant the BUS INT signal 211 so as to issue a bus release request to the CPU of the mother board. When the bus is actually released and a tristate is reached, the BUS ACK signal 212 is returned, and the CPU 201 detects that the external bus 209 is placed in the usable state. Thereupon, the I/O 206 is accessed to connect the internal bus 205 to the external bus 209, and the pointer of the interrupt jump table written in a predetermined external memory (not shown) is fetched. Since the type of the interrupt can be determined by reading the contents of the memory indicated by the pointer, when the interrupt is an interrupt related to the QuickDraw routine, the QuickDraw command is converted into process scripts in the RAM 203 and the process scripts are transmitted to the server from the LAN I/F 204.

On the server side, the mirror image of the contents drawn in the remote real memory of the whole screen is reflected in the local virtual memory 107. In practice, only the portion of a local real memory 112 having the same size as that of the screen memory 109 is copied. An address converter 113 is a circuit for performing address conversion so that the real memory 112, when seen from the external bus 209, is seen as if it was a part of the virtual memory 107. If the coordinates of the origin (upper left corner) of the virtual memory 107 are X, Y and if the coordinates of the rectangular area of the real memory 112 are x, y, the address converter 113 performs the computation of X−x and Y−y with respect to the address accessed from the external bus 209.

When the CPU (not shown) of the mother board computes using the portion displayed on the CRT, that is, only inside the real memory 112, the positional relation of the real memory on the virtual memory does not vary. However, if an attempt to access outside the real memory by scroll or the like is made, an interrupt signal 114 is generated to supply the interrupt signal to the CPU 201. The CPU 201 examines the cause of the interrupt and requests the server to send the bit-mapped image at the new coordinate position over the LAN 204, and also resets the address converter so that the relative position of the real memory is changed. In practice, the interrupt signal 114 is generated by the address converter 113.

Next, a description will be given below of the summary of the local virtual memory operation in the multimedia server in accordance with the present invention with reference to FIG. 16.

Figure 16:
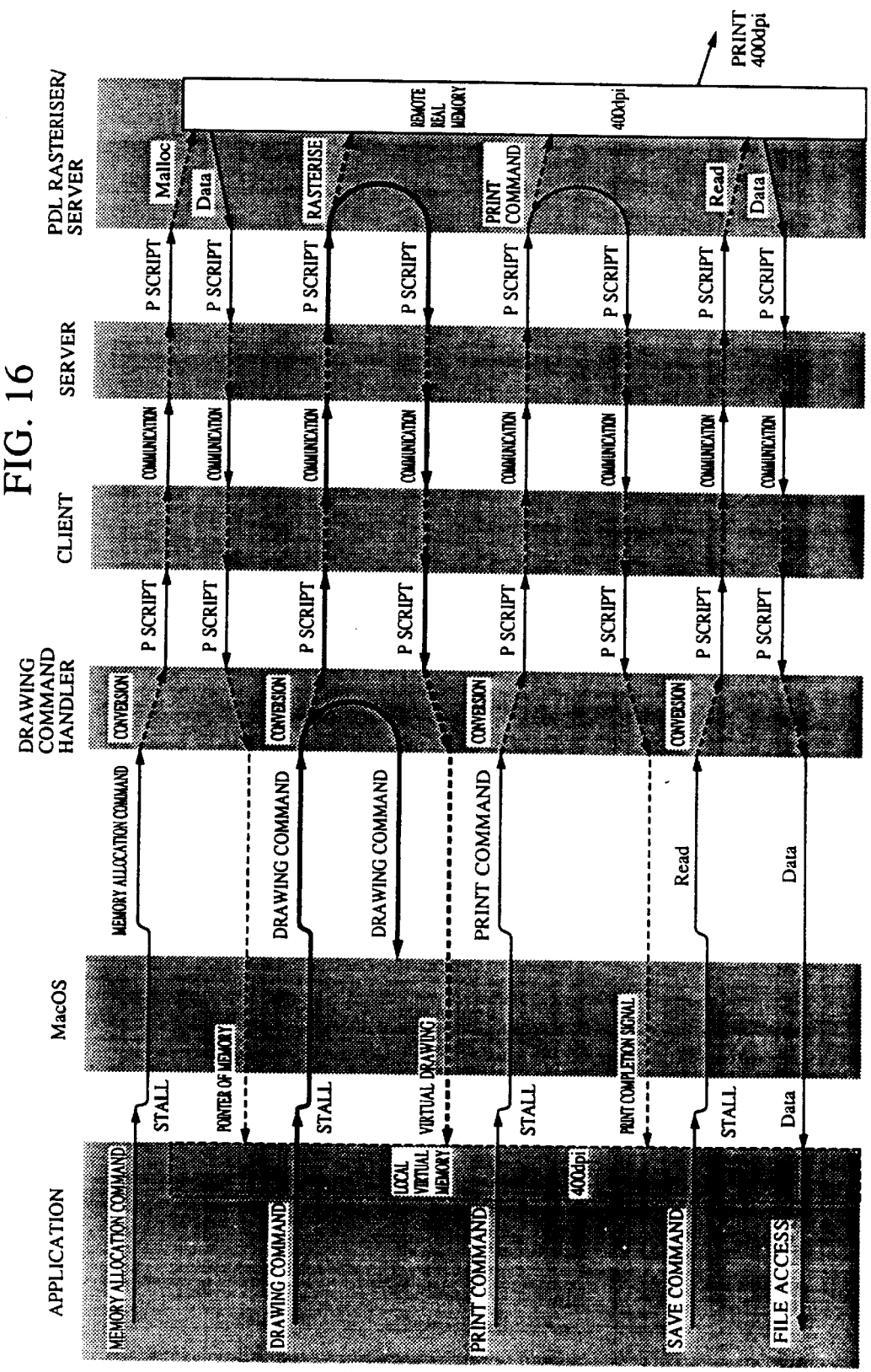
FIG. 16 is a flowchart illustrating local virtual memory processing in the multimedia server in accordance with the present invention.

FIG. 16 is a chart illustrating the summary of local virtual memory processing in the multimedia server in accordance with the present invention. The operation of the accelerator for QuickDraw under the control of, for example, MacOS, will be explained below.

In the local memory of this embodiment, instead of the application requesting the OS to allocate as a real memory primarily, the real memory allocated in the server connected through the network is processed as if it was a real memory in a virtual manner. Therefore, the local virtual memory exists virtually in the local machine of the client, and the real memory exists in the remote server.

Specifically, when the application starts drawing, the application issues a memory allocation command, for example, NewPtr (an abbreviation of New Pointer, a command for allocating the memory area) to the MacOS. The drawing command handler steals the command and converts it into process scripts (P scripts) and sends the process scripts to a PDL rasterizer/server (hereinafter referred to as a remote drawing engine) via the communication path of the client/server.

The remote drawing engine issues a malloc command (an abbreviation of memory allocate which works the same as NewPtr) to the remote MacOS (not shown) in order to allocate the real memory, and also sends back the process scripts to the client. Since the process scripts are sent back to the application from the drawing command handler as the pointer of the memory, it looks as if there was a real memory locally from the application.

Next, the application issues a "drawing command" to the MacOS in order to draw something in the local virtual memory. The "drawing command" is also stolen in the drawing command handler, converted into process scripts, sent to the "remote drawing engine" whereby the data is actually written on the remote real memory at a high resolution of 400 dpi. Since it is also necessary to draw on the monitor of the client, the remote drawing engine emulates and transmits the drawing command to the MacOS of the client. In such a case, the data is written at a low resolution of 72 dpi.

The result of the drawing is converted into process scripts, and are returned to the client similarly to that described above. This process is repeatedly performed for a required number of times (corresponds to the flow of the thick line in the figure).

When the drawing is completed and printing is performed, unless according to this embodiment, the data is rasterized at a high resolution of 400 dpi on the local client, and the large amounts of data are transmitted to the printer. According to this embodiment, since the rasterization at the high resolution is completed in the "remote engine" when the drawing is completed, it is possible to immediately start printing without sending the large amounts of data. Therefore, only the "print command" is transmitted.

Where the completed bitmap high-resolution image data is saved in a secondary storage apparatus (not shown), if, though the "save command" is issued, "data" sent from the remote drawing engine in accordance with the command is directly saved in a secondary storage apparatus or the like, it does not become necessary to provide a real memory locally.

The operation of the image drawing accelerator will be explained below in detail with reference to both the system principle diagram of FIG. 13 and the flowchart of FIG. 17.

Figure 17:
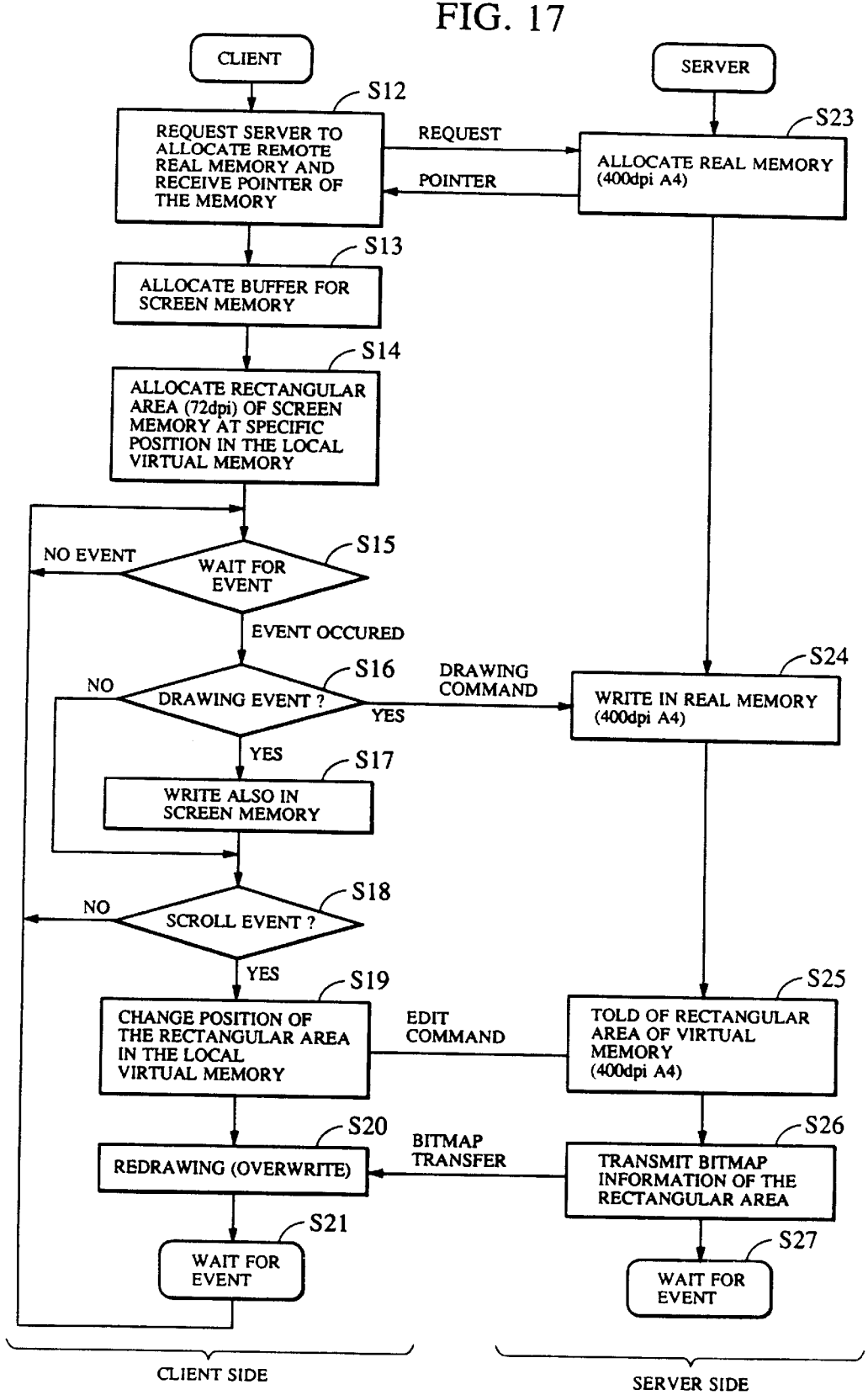
FIG. 17 is a flowchart illustrating the operation of the image drawing accelerator in accordance with the present invention.

FIG. 17 is a flowchart illustrating the operation of the image drawing accelerator 110. The left half portion from the center shows the client side, and the right half portion shows the server side. An explanation will be given by assuming that a commonly used connection operation (for example, a connection such as AppleTakl or TCP/IP) has been completed in the figure. The program shown in the flowchart in the left half portion of FIG. 16 is stored in the ROM 202 or the RAM 203 of the network drawing accelerator 110 of the client side, which program is executed by the CPU 201. The program shown in the flowchart in the right half portion of FIG. 16 is stored in the ROM (not shown) or the RAM (not shown) of the server side, which program is executed by the CPU (not shown).

Before the application of the client performs a drawing operation, an operation for allocating a memory for storing the result is performed. This operation is an operation which makes a request for the OS, and is generally called a system call. In the case of Macintosh, it is called a ToolBox call. The CPU 201 hooks the function call via the drawing command handler 103 in order to request the server side to allocate a real memory. This request is shown in the exchange in steps S12 and S23.

At the same time, the CPU 201 allocates a minimum buffer memory for the screen memory in the local machine as shown in step S13 via the drawing command handler 103. Since the screen of the local machine is 72 dpi (dot/inch), the size of the buffer memory is very small.

Next, only the pointer of the local virtual memory 107 having the same size as that of the remote real memory 108 is secured, and overwritten by using the pointer which was returned in step 23. Further, the pointer of the screen memory secured in step S13 is assigned to an appropriate portion of the space of the local virtual memory 107. As a result, a part of the picture drawn in the huge remote real memory 108 is displayed on the screen of the client.

Thereafter, the CPU 201 waits for an event via the drawing command handler 103 (step S15). When some drawing event occurs (step S16), the drawing command is transmitted to the server side, and also the same drawing is performed in the screen memory of the local machine in order to make a screen display (step S17). In the server side receiving the drawing command, the CPU (not shown) draws at a high resolution in the remote real memory 108 via the PDL rasterizer 106 (step S24).

As stated earlier, since a part of the picture drawn in the huge remote real memory 108 is displayed on the screen of the local machine, the event is a scroll event wait for scrolling the screen vertically and horizontally (step S18). In this case, a parameter representing a rectangular area of the local screen memory 109, which is assigned in such a way that the area is present in a part of the memory space represented by the local virtual memory 107 is changed by an amount corresponding to the scroll (step S19).

When the local screen memory 109 is moved within the local virtual memory 107, the picture written in the local screen memory becomes different from the picture at the same position where the picture is drawn in the remote real memory 108. Thus, the CPU 201 requests the server to send a bit-mapped image in a new rectangular area via the drawing command handler 103 (step S25). The CPU (not shown) of the server sends the bit-mapped image in the specified area to the client side (step S26), the CPU 201 of the client side copies the image in the local virtual memory 107. As a result, the image information is overwritten in the local screen memory 109, and the display screen becomes new. Thereafter, waiting for an event is repeated.

When the application 101 edits a bit-mapped image, it edits an image in the local real memory (not shown) by using the drawing function 102 of the OS, and the result is displayed on a monitor (not shown) via the screen memory 109. However, the local memory used in the present invention is the local virtual memory 107 which has only a part of the memory as an entity. As a result, it becomes unnecessary to prepare a huge memory. In this case, as indicated by the x mark in FIG. 13, the place where all the drawing commands are primarily passed to the rasterizer 102 of the OS is stolen and guided to the drawing command handler 103, and the local virtual memory 107 and the screen memory 109 are indirectly controlled as required by the rasterizer 102.

The stolen drawing command is transmitted to the PDL rasterizer 106 of the server side via the client communication program 104 and the server communication program 105. Then, a bit-mapped image is drawn in the high-resolution remote real memory 108. The image rasterized in the remote real memory 108 can be printed as it is.

The local virtual memory 107 is a memory having the same size as that of the screen memory 109 and corresponds to a part of the remote real memory 108. When network image processing is performed, a commonly used client/server connection is made between the client 104 and the server 105, after which an image memory requested by the application is allocated. The memory allocation request is fetched by the drawing command handler 103, in practice, the local virtual memory 107 is allocated in the local machine, and the entity of the real memory is allocated as the remote real memory 108 in the server as a result of the exchange between step S12 and S23. The size of the local virtual memory 107 matches the virtual size of the remote real memory 108, and differs for each document size handled.

The buffer for the screen memory is also allocated in the local machine in step S13 at the same time. Thereafter, the application 101 is placed in a state in which a drawing input event is waited, that is, the drawing command handler 103 is also placed in an input wait state. This state is shown in step S15. If the operator operates a mouse or the like and inputs some drawing command, and if the command is a drawing event, the drawing command is sent to both the rasterizer 102 of the local machine and the PDL rasterizer 106 of the server, and the data is drawn in the screen memory 109, the local virtual memory 107 and the remote real memory 108 by means of the CPU 201 and the CPU (not shown) of the server. These steps are indicated at 16, 17 and 24.

If the above drawing event is a screen scroll, the reference coordinates of the screen memory 109 in the local virtual memory 107 vary. Since there is no image there, the server is notified of the change of the rectangular area as shown in steps S19 and S25, and bitmap information is transferred to the client from the predetermined position of the remote real memory 108 as shown in steps S20 and S26. Thereafter, the server and the client alike are placed in a state in which they wait for the next event.

According to this embodiment, as described above, when a drawing function call issued from the application to the operating system is hooked, scripts corresponding to the drawing function call are issued to the server where the scripts are interpreted, the image is drawn on the image drawing memory allocated in the server, the drawn drawing image data is taken from the image memory to the operating system over the network and drawn in the screen memory. Thus, it is possible to perform an operation of drawing an image of a large amount which exceeds the amount of data which can be processed by the client at a high speed.

Also, according to this embodiment, when a drawing function call issued from the application to the operating system is hooked, scripts corresponding to the drawing function call are issued to the server where the scripts are interpreted, the image is drawn on the image drawing memory allocated in the server, the drawn drawing image data is taken from the image memory to the operating system via the local virtual memory and drawn in the screen memory. Thus, it is possible to perform an operation of drawing an image of a large amount which exceeds the amount of data which can be processed by the client, in particular, a drawing operation corresponding to the edition screen, at a high speed.

Also, according to this embodiment, scripts instructing the start of image drawing are issued from each client to the server, an image drawing program is initiated on the basis of the issued scripts, and also an image drawing memory is allocated, a parameter corresponding to the allocated is returned to the client, and a desired image is drawn in the image memory in accordance with each drawing instruction received for the client over the network. Thus, it is possible to perform an image editing operation which exceeds the image processing performance of the client.

Also, according to this embodiment, the server analyzes scripts instructing the start of image drawing from each client, and an image drawing memory for assuring image drawing of a resolution higher than that corresponding to an output device of the client is allocated. Thus, it is possible to perform an image editing operation at a high resolution which exceeds the image processing performance of the client at a high speed.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An image processing apparatus, which performs a bi-directional communication with an external apparatus, and performs image processing of image data of low resolution, said image processing apparatus comprising:

receiving means for receiving image data from said external apparatus on a basis of a request by said image processing apparatus;

extraction means for extracting drawing contents on a basis of a drawing command, called by an application, for drawing the image data received by said receiving means, wherein a drawing command is transmitted to a drawing program which is a part of OS;

generation means for generating drawing process information written in process script in accordance with the drawing contents extracted by said extraction means; and transmission means for transmitting the drawing process information to said external apparatus so that image data of high resolution stored in an image drawing memory in said external apparatus is drawn same as drawing process on a basis of the drawing command;

wherein said drawing command is used for both of drawing the received image data by said drawing program and generating the drawing process information written in process script.

2. An image processing apparatus according to claim 1, wherein said image drawing memory allocated in said external apparatus is larger than a screen memory of said image processing apparatus.

3. An image processing apparatus according to claim 1, wherein the resolution of the image data stored in said image drawing memory allocated in said external apparatus is higher than the resolution of the image data stored in a screen memory.

4. An image processing apparatus according to claim 1, wherein image data displayed on a screen memory of said image processing apparatus is a part of the image data drawn in said image drawing memory allocated in said external apparatus.

5. An image processing apparatus according to claim 1, wherein image data displayed on a screen memory of said image processing apparatus is scrolled, said processing apparatus receives a part of the image data drawn in said image drawing memory allocated in said external apparatus to store it in said screen memory.

6. An image processing apparatus according to claim 1, wherein said image processing apparatus is a host computer.

7. An image processing apparatus according to claim 1, wherein said external apparatus and said image processing apparatus perform bi-directional communication over a network.

8. An image drawing apparatus for drawing image data of high resolution which performs a bi-directional communication with a host computer for drawing image data of low resolution, said image drawing apparatus comprising:

input means for inputting from said host computer drawing process information, written in process script, which designates drawing contents in accordance with drawing commands called from an application to a drawing program which is a part of OS, running in said host computer;

drawing means for interpreting the drawing process information input from said input means and for drawing the image data of high resolution in an allocated image drawing memory; and output controlling means for, when scrolling process is requested in said host computer, controlling output means to output the image data drawn by said drawing means to the host computer and, when drawing process is requested in said host computer, controlling the output means not to output the image data drawn by said drawing means, wherein the resolution of the image data stored in said image drawing memory allocated to said image drawing apparatus is higher than the resolution of the image data stored in a screen memory of said host computer.

9. An image drawing apparatus according to claim 8, wherein said image drawing memory allocated in said image drawing apparatus is larger than said screen memory of said host computer.

10. An image drawing apparatus according to claim 8, wherein image data displayed on said screen memory of said host computer is a part of the image data drawn in said image drawing memory allocated in said image drawing apparatus.

11. An image drawing apparatus according to claim 8, wherein when the image data displayed on said screen memory of said host computer is scrolled, said image drawing apparatus outputs a part of the image data drawn in said image drawing memory allocated in said image drawing apparatus so as to store it in said screen memory of said host computer.

12. An image drawing apparatus according to claim 8, wherein said image drawing apparatus is a server.

13. An image drawing apparatus according to claim 8, wherein said host computer and said image drawing apparatus are connected to each other over a network.

14. A network system including a host computer and an external apparatus, whereby the external apparatus performs image processing of image data of low resolution and bi-directional communication with the host computer, said network system comprising:

said host computer including:

receiving means for receiving image data from said external apparatus on a basis of a request by an image processing apparatus;

extraction means for extracting drawing contents on a basis of a drawing command, called by an application, for drawing the image data received by said receiving means, wherein a drawing command is transmitted to a drawing program which is part of OS;

generation means for generating drawing process information written in process script in accordance with the drawing contents extracted by said extraction means; and transmission means for transmitting the drawing process information to said external apparatus so that image data of high resolution stored in an image drawing memory in said external apparatus is drawn same as drawing process on a basis of the drawing command;

wherein said drawing command is used for both of drawing the received image data by said drawing program and generating the drawing process information written in process script, and;

said external apparatus including:

input means for inputting drawing process information, written in process script, from said host computer which designates drawing contents in accordance with drawing commands called from an application to a drawing program which is part of OS, running in said host computer;

drawing means for interpreting the drawing process information input from said input means and for drawing image data in said allocated image drawing memory; and output controlling means for, when scrolling process is requested in said host computer, controlling output means to output the image data drawn by said drawing means to the host computer and, when drawing process is requested in said host computer, controlling the output means not to output the image data drawn by said drawing means, wherein the resolution of said image drawing memory allocated in said external apparatus is higher than the resolution of a screen memory of said host computer.

15. A network system according to claim 14, wherein said image drawing memory allocated in said external apparatus is larger than said screen memory of said host computer.

16. A network system according to claim 14, wherein the resolution of the image data stored in said image drawing memory allocated in said external apparatus is higher than the resolution of the image data stored in said screen memory.

17. A network system according to claim 14, wherein image data displayed on said screen memory of said host computer is a part of the image data drawn in the said image drawing memory allocated in said external apparatus.

18. A network system according to claim 14, wherein when the image data displayed on said screen memory of said host computer is scrolled, a part of the image data drawn in said image drawing memory allocated in said external apparatus is copied into said screen memory of said host computer.

19. A network system according to claim 14, wherein said external apparatus and a plurality of host computers are connected to each other over the network.

20. An image processing method in an image processing apparatus which performs bi-directional communication with an external apparatus and performs image processing of image data of low resolution, said image processing method comprising the steps of:

receiving image data from said external apparatus on a basis of a request by said image processing apparatus;

extracting drawing contents on a basis of a drawing command, called by an application for drawing the image data received by said receiving step, wherein a drawing command is transmitted to a drawing program which is part of OS;

generating drawing process information written in process script in accordance with the drawing contents extracted by said extracting step; and transmitting the drawing process information to said external apparatus so that image data of high resolution stored in an image drawing memory in said external apparatus is drawn same as drawing process on a basis of the drawing command;

wherein said drawing command is used for both of drawing the received image data by said drawing program and generating the drawing process information written in process script.

21. An image processing method according to claim 20, wherein said image drawing memory allocated in said external apparatus is larger than a screen memory of said image processing apparatus.

22. An image processing method according to claim 20, wherein the resolution of the image data stored in said image drawing memory allocated in said external apparatus is higher than the resolution of the image data stored in a screen memory of said image processing apparatus.

23. An image processing method according to claim 20, wherein image data displayed on a screen memory of said image processing apparatus is a part of the image data drawn in said image drawing memory allocated in said external apparatus.

24. An image processing method according to claim 20, wherein when the image data displayed on a screen memory of said image processing apparatus is scrolled, said image processing apparatus receives a part of the image data drawing in said image drawing memory allocated in said external apparatus to store it in said screen memory.

25. An image processing method according to claim 20, wherein said image display control apparatus is a host computer.

26. An image processing method according to claim 20, wherein said external apparatus and said image processing apparatus perform bi-directional communication over a network.

27. An image drawing method of drawing image data of high resolution in an image drawing apparatus which performs bi-directional communication with a host computer for drawing image data of low resolution, said image drawing method comprising the steps of:

inputting drawing process information, written in process script, from said host computer which designates drawing contents in accordance with drawing commands called from an application to a drawing program which is part of OS running in said host computer;

interpreting the input drawing process information and drawing the image data of high resolution in an allocated image drawing memory; and when scrolling process is requested in said host computer, controlling output means to output the drawn image data to the host computer, and when drawing process is requested in said host computer, controlling the output means not to output the image data drawn in accordance with the drawing commands, wherein the resolution of the image data stored in said image drawing memory allocated in said image drawing apparatus is higher than the resolution of the image data stored in a screen memory of said host computer.

28. An image drawing method according to claim 27, wherein said image drawing memory allocated in said image drawing apparatus is larger than said screen memory of said host computer.

29. An image drawing method according to claim 27, wherein image data displayed on said screen memory of said host computer is a part of the image data drawn in said image drawing memory allocated in said image drawing apparatus.

30. An image drawing method according to claim 27, wherein when the image data displayed on said screen memory of said image display control apparatus is scrolled, said image drawing method outputs a part of the image data drawn in said image drawing memory so as to store it in said screen memory of said host computer.

31. An image drawing method according to claim 27, wherein said image drawing apparatus is a server.

32. An image drawing method according to claim 27, wherein said host computer and said image drawing apparatus are connected to each other over a network.

* * * * *

UNITED STATES PATENT AND TRADEMARK OFFICE
CERTIFICATE OF CORRECTION

PATENT NO. : 6,317,115 B1
DATED : November 13, 2001
INVENTOR(S) : Yoshikazu Yokomizo It is certified that error appears in the above-identified patent and that said Letters Patent is hereby corrected as shown below:

Column 1,
Line 15, "provide" should read -- provides --;
Line 20, "have come to have" should read -- now include --; and
Line 53, "the" (second occurrence) should read -- a --.

Column 2,
Line 21, "the" (third occurrence) should be deleted.

Column 3,
Line 67, "will" should read -- will be --.

Column 5,
Line 12, "like" should read -- as --;
Line 16, "operations" should read -- operations, --;
Line 46, "works" should read -- functions --; and
Line 56, "being not" should read -- not being --.

Column 6,
Line 1, "needs not to be the same" should read -- need not be the same type --;
Line 5, "works" should read -- functions --;
Line 33, "transfers" should read -- transfers messages --;
Line 35, "paired, which" should read -- paired. The received --; and "client," should read -- client, and --;
Line 38, "server, and the" should read -- server. The --;
Line 62, "that" should be deleted; and
Line 66, "places cannot be performed" should read -- locations which cannot perform --.

Column 7,
Line 1, "is" should read -- is such --;
Line 8, "a thing" should read -- an operation --;
Line 11, "through the" should read -- by --;
Line 22, "network," should be deleted;
Line 28, "server receives" should read -- server, and receives --; and
Line 39, "network is connected to the" should be deleted.

Column 8,
Line 4, "below in detail" should read -- in detail below --;
Line 23, "understands" should read -- understand --;
Line 27, "function server 44" should read -- center server 43 --; and
Line 63, "when" should read -- the time --; and "cannot be" should read -- is not --.

UNITED STATES PATENT AND TRADEMARK OFFICE
CERTIFICATE OF CORRECTION

PATENT NO. : 6,317,115 B1
DATED : November 13, 2001
INVENTOR(S) : Yoshikazu Yokmomizo It is certified that error appears in the above-identified patent and that said Letters Patent is hereby corrected as shown below:

Column 9,
Line 1, "scripts is prepared," should read -- script, --;
Line 3, "looks" should read -- appears --;
Line 6, ""stored forward"" should read -- "store and forward" --;
Line 7, "each time of" should read -- for each --;
Line 8, "the" should be deleted;
Line 10, ""stored forward"" should read -- "store and forward" --;
Line 12, ""writes"." should read -- "writes" a command. --;
Line 14, "easier to such an" should read -- simpler to certain --;
Line 22, "no" should read -- any --;
Line 24, "explained." should read -- described. --;
Line 29, "practical at all." should read -- at all practical. --;
Line 31, ""stored forward"" should read -- "store and forward" --;
Line 36, "stupendously" should read -- significantly --;
Line 45, "more quick" should read -- in this network which is faster --; and
Line 46, "method in this network." should read -- method. --.

Column 10,
Line 23, "in which" should read -- of --;
Line 56, "stored" should read -- store and --; and
Line 65, "one" should read -- method --.

Column 11,
Line 11, "real" should read -- a real --;
Line 41, "runs" should read -- always runs --;
Line 42, "always" should be deleted;
Line 52, "needs not to" should read -- need --; and
Line 60, "each" should read -- to each --.

Column 12,
Line 9, "the" should be deleted; and "a little," should read -- to a certain extent, --;
Line 11, "like" should read -- such as --; and "at the" should read -- with --;
Line 43, "for" should be deleted;
Line 54, "at worst." should read -- for worst case. --;
Line 56, "the" (first occurrence) should be deleted;
Line 61, "automated" should read -- considerably automated. --; and
Line 62, "considerably." should be deleted.

UNITED STATES PATENT AND TRADEMARK OFFICE
CERTIFICATE OF CORRECTION

PATENT NO. : 6,317,115 B1
DATED : November 13, 2001
INVENTOR(S) : Yoshikazu Yokmomizo It is certified that error appears in the above-identified patent and that said Letters Patent is hereby corrected as shown below:

Column 13,
Line 22, "server" should read -- server. --;
Line 29, "Gigabytes." should read -- Gigabyte. --;
Line 31, "client" should read -- client, --;
Line 32, "to" should read -- with --;
Line 52, "used" should read -- used. --; and
Lines 63 and 66, "work" should read -- function --.

Column 14,
Line 13, "A3" should read -- A3 size --;
Line 24, "whole" should read -- entire --; and "is" (second occurrence) should read
-- were --; and
Line 42, "allocated usually" should read -- usually allocated --.

Column 15,
Line 11, "is" should read -- is currently --;
Line 12, "currently" should be deleted;
Line 26, "explained." should read -- described. --; and "the" (first occurrence) should be deleted;
Line 46, "provides" should read -- provides a --;
Line 48, "left" should read -- left side --;
Line 51, "right" should read -- right side --; and
Line 67, "whole" should read -- entire --.

Column 16,
Lines 2 and 36, "whole" should read -- entire --; and
Line 4, "(υbus)" should read -- (υ bus) --.

Column 17,
Line 26, "looks" should read -- appears --.

Column 18,
Line 26, "pointer" should read -- pointer of the real memory --.

Column 19,
Line 34, "waited," should read -- waited for, --;
Line 62, "an" (second occurrence) should read -- a high speed --; and
Line 64, "client at a high speed." should read -- client. --.

UNITED STATES PATENT AND TRADEMARK OFFICE
CERTIFICATE OF CORRECTION

PATENT NO. : 6,317,115 B1
DATED : November 13, 2001
INVENTOR(S) : Yoshikazu Yokmomizo It is certified that error appears in the above-identified patent and that said Letters Patent is hereby corrected as shown below:

Column 20,
Line 32, "embodiment" should read -- embodiments --.

Column 22,
Line 32, "and;" should read -- and --.

Signed and Sealed this

Twenty-eighth Day of February, 2006

JON W. DUDAS
*Director of the United States Patent and Trademark Office*